United States Patent
Mandloi et al.

(10) Patent No.: US 11,880,783 B2
(45) Date of Patent: Jan. 23, 2024

(54) ELECTRONIC METHODS AND SYSTEMS FOR FASTER CHECKOUT IN AN E-COMMERCE TRANSACTION

(71) Applicant: Mastercard International Incorporated, Purchase, NY (US)

(72) Inventors: Abhay Mandloi, Pune (IN); Rajeev Kumar, Benares (IN)

(73) Assignee: Mastercard International Incorporated, Purchase, NY (US)

(*) Notice: Subject to any disclaimer, the term of this patent is extended or adjusted under 35 U.S.C. 154(b) by 354 days.

(21) Appl. No.: 17/071,457

(22) Filed: Oct. 15, 2020

(65) Prior Publication Data
US 2021/0150511 A1 May 20, 2021

(30) Foreign Application Priority Data
Nov. 14, 2019 (IN) .............................. 201941046321

(51) Int. Cl.
*G06Q 20/36* (2012.01)
*G06Q 20/40* (2012.01)
(Continued)

(52) U.S. Cl.
CPC ......... *G06Q 20/3674* (2013.01); *G06Q 20/12* (2013.01); *G06Q 20/28* (2013.01);
(Continued)

(58) Field of Classification Search
CPC .... G06Q 20/3674; G06Q 20/12; G06Q 20/28; G06Q 20/405; G06Q 20/407; G06Q 20/4097; G06Q 20/42
See application file for complete search history.

(56) References Cited

U.S. PATENT DOCUMENTS 11,538,034 B2 * 12/2022 Oosthuizen .......... G06Q 20/401
2004/0254848 A1 * 12/2004 Golan .................... G06Q 20/12
705/26.1
(Continued)

FOREIGN PATENT DOCUMENTS

WO    WO-2011063432 A2 *  5/2011  ............. G06Q 20/28

*Primary Examiner* — Zeshan Qayyum
*Assistant Examiner* — Taylor S Rak
(74) *Attorney, Agent, or Firm* — Hovey Williams LLP

(57) ABSTRACT

Embodiments provide methods, and server systems for enhancing checkout experience of an e-commerce transaction. A method includes receiving, by a server system associated with a payment network, a pre-authentication request signal for a prospective e-commerce transaction for a payment card of user. The pre-authentication request signal includes a time data for an expected transaction time, a transaction amount data, a payment card data and at least one transaction identifier data. The method includes electronically facilitating a pre-authentication of the prospective e-commerce transaction based at least on performing a multi-factor pre-authentication. Upon successful pre-authentication, the method includes storing a pre-authenticated transaction data. The method includes sending a notification signal of successful pre-authentication to a user device. The method includes processing the prospective e-commerce transaction at the expected transaction time based on a user input received using a user interface of an e-commerce application and upon successfully verifying the pre-authenticated transaction data.

14 Claims, 20 Drawing Sheets

(51) Int. Cl.
*G06Q 20/42* (2012.01)
*G06Q 20/12* (2012.01)
*G06Q 20/28* (2012.01)

(52) U.S. Cl.
CPC ......... *G06Q 20/405* (2013.01); *G06Q 20/407* (2013.01); *G06Q 20/4097* (2013.01); *G06Q 20/42* (2013.01)

(56) References Cited

U.S. PATENT DOCUMENTS

| | | | |
|---|---|---|---|
| 2009/0070265 A1* | 3/2009 | Hrabosky | G06Q 20/26 705/35 |
| 2011/0276478 A1* | 11/2011 | Hirson | G06Q 20/16 705/40 |
| 2012/0173423 A1* | 7/2012 | Burdett | G06Q 20/3223 705/44 |
| 2015/0039506 A1* | 2/2015 | Groarke | G06Q 20/02 705/44 |
| 2015/0206142 A1* | 7/2015 | Kurian | G06Q 20/401 705/44 |
| 2018/0181963 A1* | 6/2018 | Birukov | G06Q 20/3274 |
| 2021/0073813 A1* | 3/2021 | Nolte | G06Q 20/3829 |

* cited by examiner

ELECTRONIC METHODS AND SYSTEMS FOR FASTER CHECKOUT IN AN E-COMMERCE TRANSACTION

CROSS REFERENCE TO RELATED APPLICATIONS

This application claims priority to Indian Application No. 201941046321, filed Nov. 14, 2019, which is incorporated herein by reference in its entirety

TECHNICAL FIELD

The present disclosure relates to electronic payment technology and, more particularly to, methods and systems for enabling faster checkout in an e-commerce transaction.

BACKGROUND

Nowadays, many consumers use several banking cards, such as credit cards, debit cards, prepaid cards, etc., for performing financial transactions (e.g., payment transaction). The various banking cards are herein referred to as payment cards. Online purchases done using credit or debit cards are referred to as Card Not Present (CNP) transactions. Authentication refers to the consumer proving to an issuer bank that it is indeed him/her performing a transaction. CNP transactions can be particularly vulnerable to fraudulent activities because it is difficult for a merchant to verify whether the person buying a product using the payment card actually is authorized to use it. To avoid such risks, there exists a mandatory multi-factor authentication regulation in countries such as India for all e-commerce transactions. For example, during a CNP transaction along with the details available on the payment card, the second level of identification is needed e.g., a long-term password or a One-Time Password (OTP) for performing two-factor authentication. The banks typically leverage a Three-Domain (3-D) Secure messaging protocol to enable a consumer to authenticate himself with his card issuer by sending the OTP to the mobile number or the email ID which is registered with the payment card number of the consumer.

The consumer needs to enter the OTP received via the mobile number or the email ID on a dedicated UI for authenticating himself. The OTP is verified and only after a successful verification of the OTP or the long-term password, the authentication process completes, and the transaction is processed further. This is a time-consuming process for the consumer checkout experience. Further, it can be very inconvenient for the consumer to complete the transaction in time for making online purchases during different types of online sales such as, the Big Billion Day sale, the Black Friday sale, the End of Season sale, the Festival oriented sale etc., where the merchants provide various online offers and discounts on their products and services for specific number of days or for specific number of hours per day.

Accordingly, there is a need for techniques that enable multi-factor authentication performed in advance so that the consumer only needs to process the pre-authenticated transaction at a specific time in future to make time bound online purchases hassle-free.

SUMMARY

Various embodiments of the present disclosure provide systems, methods, electronic devices and computer program products for enhancing checkout experience for example faster checkout in an e-commerce transaction especially by pre-authenticating the e-commerce transaction in advance.

In an embodiment, a computer-implemented method is disclosed. The method includes receiving, by a server system associated with a payment network, a pre-authentication request signal for a prospective e-commerce transaction for a payment card of a user. The pre-authentication request signal includes a time data for an expected transaction time, a transaction amount data, a payment card data of the payment card and at least one transaction identifier data. The method includes, electronically facilitating, by the server system, a pre-authentication of the prospective e-commerce transaction in response to the receipt of the pre-authentication request signal. The pre-authentication is based at least on performing a multi-factor pre-authentication. Upon successful pre-authentication of the prospective e-commerce transaction, the method includes storing, by the server system, a pre-authenticated transaction data for the prospective e-commerce transaction. The method includes sending, by the server system, a notification signal of successful pre-authentication of the prospective e-commerce transaction to a user device. The method includes processing, by the server system, the prospective e-commerce transaction at the expected transaction time based on a user input received using a user interface of an e-commerce application and upon successfully verifying the pre-authenticated transaction data.

In another embodiment, a server system in a payment network is provided. The server system includes a communication interface configured to receive a pre-authentication request signal for a prospective e-commerce transaction for a payment card of a user. The pre-authentication request signal includes a time data for an expected transaction time, a transaction amount data, a payment card data of the payment card and at least one transaction identifier data. The server system includes a memory including executable instructions and a processor communicably coupled to the communication interface. The processor is configured to execute the instructions to cause the server system to at least electronically facilitate a pre-authentication of the prospective e-commerce transaction in response to the receipt of the pre-authentication request signal. The pre-authentication is based at least on performing a multi-factor pre-authentication. Upon successful pre-authentication of the prospective e-commerce transaction, the server system is further caused to store a pre-authenticated transaction data for the prospective e-commerce transaction. The server system is further caused to send a notification signal of successful pre-authentication of the prospective e-commerce transaction to a user device. The server system is further caused to process the prospective e-commerce transaction at the expected transaction time based on a user input received using a user interface of an e-commerce application and upon successfully verifying the pre-authenticated transaction data.

In yet another embodiment, another computer-implemented method is disclosed. The method includes receiving, by a server system associated with a payment network, an e-commerce transaction request signal to process a pre-authenticated e-commerce transaction. The e-commerce transaction request signal is generated based on a user input received using a user interface of an e-commerce application. The e-commerce transaction request signal includes a purchase amount data and at least one transaction identifier data. The pre-authentication of the e-commerce transaction for a payment card of a user is electronically facilitated based on receiving a pre-authentication request signal at a previous time. The method includes, verifying, by the server system, the pre-authentication of the e-commerce transaction using a pre-authenticated transaction data. The pre-authentication transaction data includes the at least one transaction identifier. The method includes processing, by the server system, the pre-authenticated e-commerce transaction by crediting a purchase amount to a merchant account. The purchase amount is credited from a transaction amount prepaid at the previous time for pre-authenticating the e-commerce transaction.

BRIEF DESCRIPTION OF THE FIGURES

For a more complete understanding of example embodiments of the present technology, reference is now made to the following descriptions taken in connection with the accompanying drawings in which.

Figure 1:
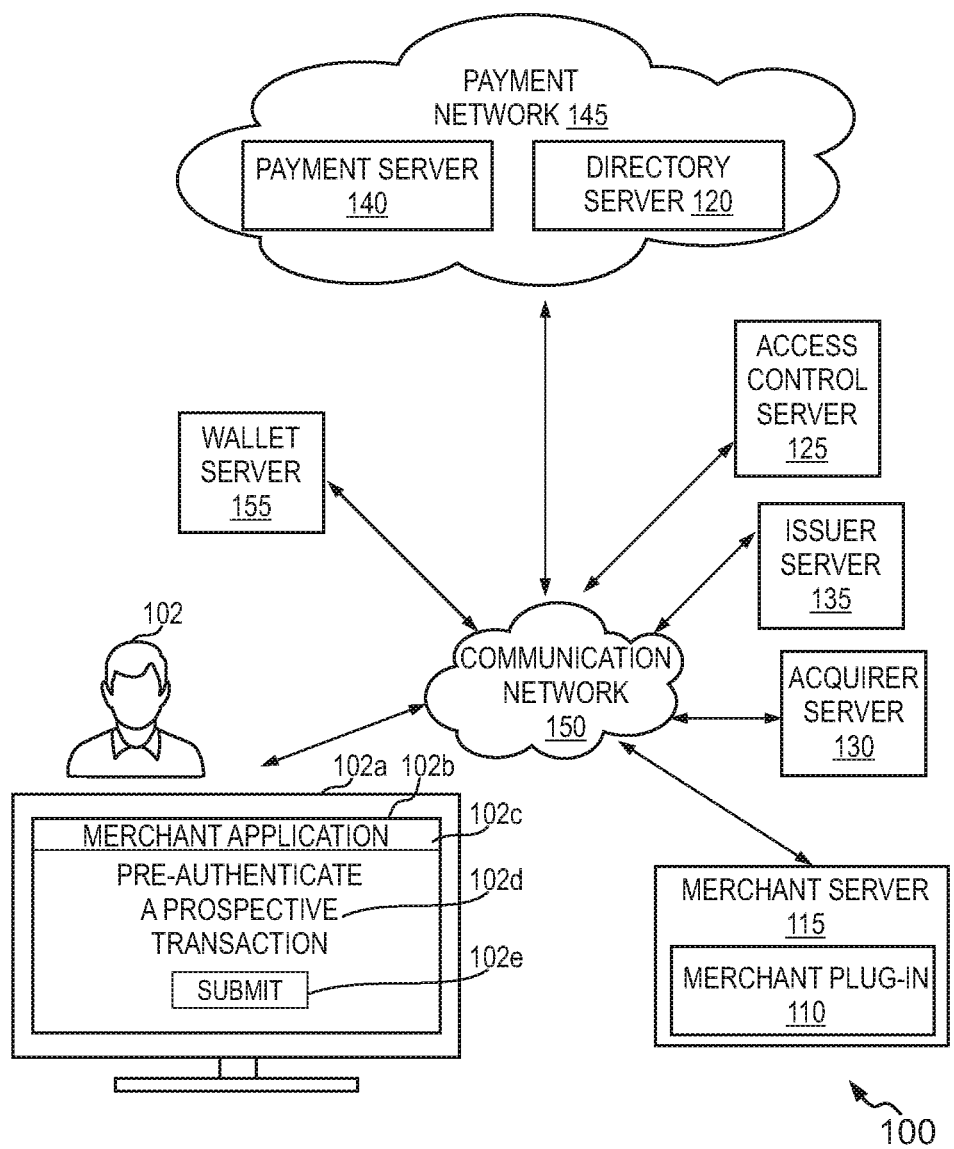
FIG. 1 illustrates an example representation of an environment, related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" at various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "payment account" used throughout the description refers to a financial account that is used to fund the financial transaction (interchangeably referred to as "payment transaction"). Examples of the payment account include, but are not limited to a savings account, a credit account, a checking account and a virtual payment account. The payment account may be associated with an entity such as an individual person, a family, a commercial entity, a company, a corporation, a governmental entity, a non-profit organization and the like. In some scenarios, a payment account may be a virtual or temporary payment account that can be mapped or linked to a primary payment account, such as those accounts managed by digital wallet or other payment application.

The term "payment network", used throughout the description, refers to a network or collection of systems used for transfer of funds through use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be operated to perform transactions via cash-substitutes, which may include payment cards, letters of credit, checks, financial accounts, etc. One example of a payment network includes those operated by Mastercard.

The term "payment card", used throughout the description, refers to a physical or virtual card linked with a financial or payment account that may be used to fund a financial transaction to a merchant or any such facility via the associated payment account. Examples of the payment card include, but are not limited to, debit cards, credit cards, prepaid cards, virtual payment numbers, virtual card numbers, forex cards, charge cards and stored-value cards. A payment card may be a physical card that may be presented to the merchant for funding the payment. Alternatively, or additionally, the payment card may be embodied in form of data (e.g., a digital token) stored in a user device, where the data is associated with the payment account such that the data can be used to process the financial transaction between the payment account and a merchant's financial account.

The term "pre-authentication", used throughout the description, refers to a multi-factor authentication performed in advance and an authorization performed in advance (i.e., pre-authorization). The multi-factor authentication is a security control that requires users to verify their identities by providing multiple pieces of evidence before gaining access to a device or an application. The user can prove he is who he claims to be by providing information only he knows, like a password or answers to challenge questions (e.g., a single-factor authentication), by entering a One-Time Password (OTP) or a long term password (e.g., a two-factor authentication), and by providing a characteristic unique to who he is, such as a fingerprint, a retina scan, or a voice recognition (e.g., a three-factor authentication). Multi-factor authentication involves two of the factors or it could involve all three factors or many more factors. As per the Payment Card Industry Data Security Standard (PCI DSS), references to two-factor authentication are replaced with multi-factor authentication. However, organizations can use two of the three factors to be in PCI compliance. Authorization is a verification performed by a payment card issuer of the validity of the payment card data provided by the cardholder and of consent to the charge based on internal rules (ecommerce allowed, acquiring country allowed, funds available, etc.).

Overview

Various example embodiments of the present disclosure provide methods, systems, user devices and computer program products for pre-authenticating a prospective e-commerce transaction to be processed at an expected transaction time in future so as to provide a faster checkout experience to a consumer/user.

In various example embodiments, the present disclosure provides a server system e.g., a payment server in a payment network configured to receive a pre-authentication request signal for a prospective e-commerce transaction for a payment card of a user. The pre-authentication request signal is received from an e-commerce application running on a user device. Alternatively, the pre-authentication request signal is received from a payment application facilitated by the payment server or a wallet application facilitated by a wallet server. The pre-authentication request signal includes a time data for an expected transaction time, a transaction amount data, a payment card data of the payment card and at least one transaction identifier data.

For example, the user may enter details for the prospective e-commerce transaction on a User Interface (UI) of the e-commerce application such as between 6:00 pm to 7:00 pm on 15 Oct. 2019, the user wishes to perform an e-commerce transaction for the transaction amount of 5000 INR using the payment card data (e.g., a payment card number, an expiry date, a CVV number etc.) of the payment card. The at least one transaction identifier is one of a merchant ID, a prospective e-commerce transaction reference number, an e-commerce application login ID of the user, a wallet application login ID of the user, an e-commerce application Universal Resource Locator (URL), a wallet application URL and the like.

In one embodiment, the server system electronically facilitates the pre-authentication of the prospective e-commerce transaction in response to the receipt of the pre-authentication request signal by performing a multi-factor pre-authentication. When the user enters the time data for an expected transaction time, the transaction amount data and the payment card data on the checkout page of a merchant application/an e-commerce application provided by a merchant server, pre-authentication process is initiated by a Merchant Plug-in (MPI) associated with the merchant server. The MPI interacts with a directory server to verify if an Access Control Server (ACS) has participated for performing pre-authentication. The card issuer needs to deploy an ACS to receive Three-Domain (3-D) Secure messages, process the messages, and authenticate the cardholder. The directory server includes a list of one or more Bank Identifier Numbers (BINs). Each of the one or more BINs is stored against each of one or more corresponding Universal Resource Locators (URLs) of each of one or more ACSs participating/enrolled for performing pre-authentication.

The directory server verifies if the ACS has participated for performing pre-authentication using a corresponding BIN extracted from the payment card number. Upon successful verification, the directory server retrieves a corresponding URL stored against the corresponding BIN. The directory server sends the corresponding URL to the user device via the MPI. The browser of the user device reads the URL and sends a request to load corresponding User Interfaces (UIs) to the identified ACS. Thereafter, the ACS retrieves the stored mobile number and/or the email ID of the user associated with the payment card. The ACS sends an OTP to the associated mobile number and/or the email ID of the user. Upon successful verification of the OTP entered by the user using the user device, the ACS sends a response of successful verification of the OTP via the MPI to the merchant server.

Further, the server system sends the transaction amount data and the payment card data of the payment card to an issuer server associated with the card issuer. The issuer server is configured to perform pre-authorization by verifying the payment card data and the transaction amount data. Upon successful verification, the issuer server debits the transaction amount from an issuer account of the user. The payment server receives a successful pre-authentication notification signal from the issuer server. The payment server holds the transaction amount for processing the pre-authenticated prospective e-commerce transaction at the expected transaction time.

Upon successful pre-authentication (and pre-authorization) of the prospective e-commerce transaction, the server system stores a pre-authenticated transaction data for the prospective e-commerce transaction. The pre-authenticated transaction data includes the time data/time period data for the expected transaction time, the transaction amount data, the payment card data of the payment card, and the at least one transaction identifier data. The server system sends a notification of successful pre-authentication of the prospective e-commerce transaction to the user device via the merchant plug-in. The merchant updates a transaction record in a pre-authenticated transaction database of the merchant server to let the user know of the successful pre-authentication of the prospective e-commerce transaction.

In one embodiment, the server system is configured to receive an e-commerce transaction request signal to process the pre-authenticated e-commerce transaction at the expected transaction time. The e-commerce transaction request signal is generated based on the user input received using a UI of the e-commerce application. The e-commerce transaction request signal includes a purchase amount data and the at least one transaction identifier data. For example, the user may login into the e-commerce application any time between 6:00 pm to 7:00 pm on 15 Oct. 2019. The user may select the items for the purchase for a purchase amount of 2000 INR and select a pre-authenticated transaction as a payment method option using a dedicated UI displayed by the e-commerce application. The user selection of the payment method option generates the e-commerce transaction request signal.

The server system is configured to verify the pre-authentication of the e-commerce transaction using the pre-authenticated transaction data (e.g., the at least one transaction identifier data). Upon successful verification of the pre-authentication, the server system sends a successful verification notification signal of the pre-authentication of the e-commerce transaction to an acquirer server. The acquirer server is configured to credit a purchase amount from the transaction amount to a merchant account. For example, the purchase amount of 2000 INR is credited to the merchant account by the acquirer server from the transaction amount of 5000 INR held by the payment server during pre-authentication of the e-commerce transaction.

In one embodiment, the server system receives a balance amount reversal request signal from the user device using a UI of the e-commerce application. The server system is configured to electronically facilitate reversal of a balance amount (e.g., 3000 INR) calculated from a difference of the transaction amount (e.g., 5000 INR) and the purchase amount (e.g., 2000 INR). In another embodiment, the server system is also configured to electronically facilitate reversal of the transaction amount (e.g., 5000 INR), if the user input is not received using the user interface of the e-commerce application to process the pre-authenticated e-commerce transaction at the expected transaction time. The held transaction amount is credited back to the issuer account of the user by the issuer server. The server system is configured to notify the user device by sending a transaction amount reversal response signal. Various example embodiments of present disclosure are described hereinafter with reference to FIGS. 1 to 18.

FIG. 1 illustrates an example representation of an environment 100, in which at least some example embodiments of the present disclosure can be implemented. A user 102 is shown using a user device 102*a* (e.g., a desktop computer 102*a*) on which a merchant application 102*c* (i.e., an e-commerce application) is running. Other examples of the user device 102*a* include, but are not limited to, a personal computer (PC), a mobile phone, a tablet device, a Personal Digital Assistant (PDA), a voice activated assistant, a Virtual Reality (VR) device, a smartphone and a laptop. In one embodiment, the merchant application 102*c* is provided by a merchant server 115. The merchant application 102*c* can be a merchant website, mobile or desktop applications, or third-party websites or applications using which the consumer/user may purchase goods or services from a remote location.

A User Interface 102*b* (UI 102*b*) of the merchant application 102*c* is shown to display an information field 102*d* displaying text, 'pre-authenticate a prospective transaction'. The user 102 clicks a button 102*e* labelled 'submit' to submit the pre-authentication request for a prospective e-commerce transaction at an expected transaction time in future. In one example embodiment, the user 102 generates the pre-authentication request using one of his payment cards as preferred payment method. The user 102 is provided a payment card by a card issuer such as an issuer bank. A corresponding issuer server 135 is associated with a financial institution normally called as an "issuer bank" or "issuing bank" or simply "issuer", in which the user 102 may have an account, which issues a payment card, such as a credit card or a debit card. The user 102 can use the payment card data associated with the payment card to tender payment for a purchase from a merchant.

In another example embodiment, the user 102 may generate the pre-authentication request using a wallet application as a preferred payment method. The wallet application may be facilitated by a wallet server 155. The wallet server 155 is associated with a token requestor which needs to be registered with a token service provider (e.g., a payment server 140) in order to request generation of the digital tokens. Examples of token requestor include mobile banking applications, bank wallet applications, third-party wallet applications, payment gateways and the like. Digital wallet platforms such as Apple Pay®, Samsung Pay®, Google pay, Microsoft Wallet etc., provide mobile and web applications using which the users can generate the tokenization request of their payment cards as well as use the generated digital tokens for digital payments at the merchant interfaces. In such case, the UI 102*b* may be displayed by the wallet application. Further, the user 102 may select a prepaid e-wallet maintained by the wallet server 155 or a digitized payment card as a preferred payment method from the wallet application.

In yet another example embodiment, the pre-authentication request may be generated using a payment application facilitated by the payment server 140 associated with a payment network 145. The payment network 145 may be used by the payment cards issuing authorities as a payment interchange network. The pre-authentication request includes various data such as a payment card data of the payment card of the user 102, user preferred expected transaction time-period for performing the prospective e-commerce transaction, a transaction amount data and at least one transaction identifier data.

Various embodiments of the present disclosure provide mechanisms such that pre-authentication is enabled for processing the prospective e-commerce transaction. In one embodiment, the merchant application 102*c* sends the payment card number retrieved from the pre-authentication request signal to a Merchant Plug-In (MPI) 110. The MPI 110 is an e-commerce software installed on the merchant server 115. The MPI 110 may be provided by a third-party developer. The MPI 110 communicates directly with the card issuers' servers to identify if the cardholder's account number is enrolled for 3-D Secure. The MPI 110 also interacts with a directory server 120 in the payment network 145 to verify if an access control server (e.g., the access control server (ACS) 125, hereinafter alternatively referred to as "ACS 125") has participated for performing pre-authentication.

In the 3-D Secure messaging protocol, the ACS 125 is installed in the issuer domain (banks). Each card issuer is required to maintain an ACS 125 which is used to support cardholder authentication. The ACS 125 may be deployed by the issuer associated with the issuer server 135. Alternatively, the issuer may outsource the ACS 125 to a third-party developer.

The directory server 120 identifies the ACS 125 enrolled for performing pre-authentication using a corresponding Bank Identifier Number (BIN). Once identified, the ACS 125 provides a UI 102b on the user device 102a to enable the user 102 to enter a One-time Password (OTP) sent by the ACS 125 to a mobile number and/or an email ID associated with the payment card of the user 102. The ACS 125 validates the OTP to complete the pre-authentication process.

Using the payment network 145, the computers of the acquirer bank/the acquirer server 130 or the merchant processor will communicate with the computers of the issuer/the issuer server 135 to determine whether the customer's account (i.e., the user 102's account) is in good standing and whether the purchase is covered by the customer's available account balance. Based on these determinations, pre-authorization of the payment transaction is declined or accepted. When the pre-authorization is accepted, the available balance of the customer's account is decreased. The payment server 140 holds the debited transaction amount for processing the prospective e-commerce transaction at the expected transaction time. To accept payment, the merchant will first establish an account with a financial institution that is part of the financial payment system. This financial institution is usually called the "merchant bank" or the "acquiring bank" or "acquirer bank" or simply "acquirer". The acquirer server 130 is associated with the acquirer bank.

In one embodiment, the payment server 140 receives an e-commerce transaction request initiated from the user device 102a using the merchant application 102c at the expected transaction time to process the pre-authenticated e-commerce transaction. The payment server 140 verifies the pre-authentication using the at least one transaction identifier data. Upon successful verification, the payment server 140 immediately notifies the acquirer server 130 to credit an actual purchase amount from the held transaction amount into a merchant account. According to a process of one payment network operator, a charge is not posted immediately to the customer's account as a merchant will not charge, or "capture," a transaction amount until goods are shipped or services are delivered. When the merchant ships or delivers the goods or services, the merchant captures the transaction amount by, for example, appropriate data entry procedures on the merchant application. If the customer cancels a transaction before it is captured, a "void" is generated. If the customer returns goods after the transaction has been captured, a "credit" is generated.

After a transaction is captured, the transaction is settled between the merchant, the acquirer and the issuer. Settlement refers to the transfer of financial data or funds among the merchant's account, the acquirer, and the issuer, related to the transaction. Transactions may be captured and accumulated into a "batch", which are settled as a group.

In a non-limiting example, the process of pre-authentication and pre-authorization of the prospective e-commerce transaction and completion of the pre-authenticated e-commerce transaction at the expected transaction time are processed by a combination of the merchant server 115, the directory server 120, the ACS 125, an acquirer server 130, the issuer server 135, the payment server 140, and the wallet server 155. In one embodiment, the payment server 140 and the directory server 120 are associated with the payment network 145. The user device 102a, the issuer server 135, the acquirer server 130, the merchant server 115, the payment server 140, the directory server 120, the wallet server 155 and the ACS 125 communicate with one another using a communication network 150. Examples of the communication network 150 may include any type of wired network, wireless network, or a combination of wired and wireless networks. A wireless network may be a wireless local area network ("WLAN"), a wireless wide area network ("WWAN"), or any other type of wireless network now known or later developed. Additionally, the communication network 150 may be or include the Internet, intranets, extranets, microwave networks, satellite communications, cellular systems, personal communication services ("PCS"), infrared communications, global area networks, or other suitable networks, etc., or any combination of two or more such networks.

In existing (conventional) e-commerce payment transaction methods (i.e., not in accordance with the present disclosure), the user ends up spending a significant amount of time taken by multiple servers to complete PCI mandates such as authentication and authorization processes for processing a transaction. It may also happen that the user may have to let go a whole purchase of selected discounted items on a Big Billion Day sale only because of the time spent in completing such a long transaction process. Further, it may happen that the selected discounted items are no longer available/sold out by the time the user reinitiates the whole purchase. This is a very frustrating checkout experience for the user specially on the days with significant sales provided by e-commerce applications.

In contrast to existing payment transaction methods, by using the embodiments of the present disclosure, the user needs to only select a pre-authenticated transaction for purchasing the items of his choice from the e-commerce application and the transaction gets completed in factions of seconds without the need to follow all the authorization and authentication steps. This enhances the user experience of the checkout on the e-commerce application and customer satisfaction further promotes the sales on the merchant side. Some non-exhaustive example embodiments of completing a pre-authenticated e-commerce transaction by performing authentication in advance are described with reference to the following description, particularly with reference to FIG. 2A-2B to FIG. 9.

Figure 2A:
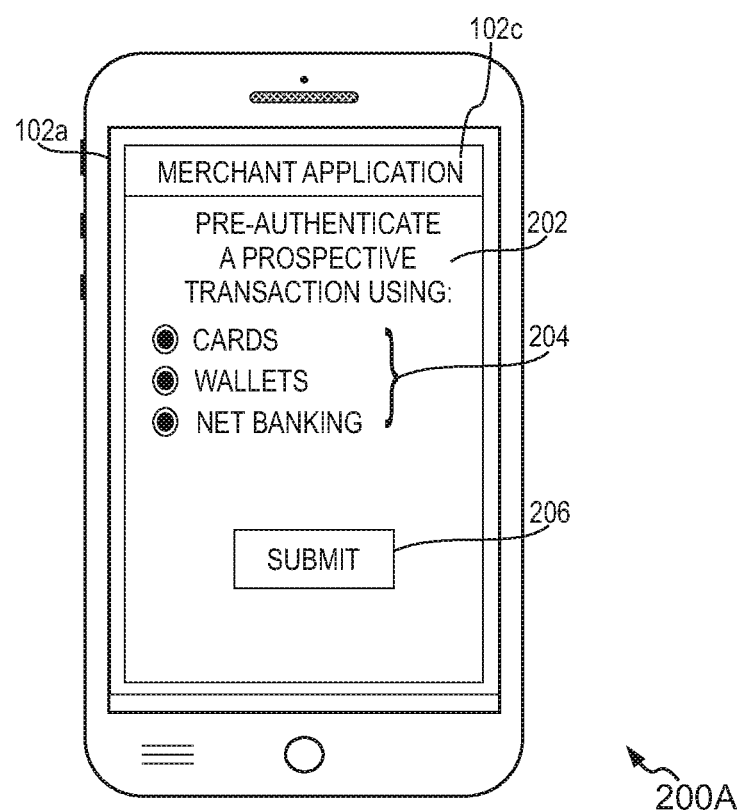
FIGS. 2A and 2B collectively represent corresponding user interfaces for generating a pre-authentication request signal for processing a prospective e-commerce transaction at an expected transaction time, in accordance with an example embodiment.
Figure 2B:
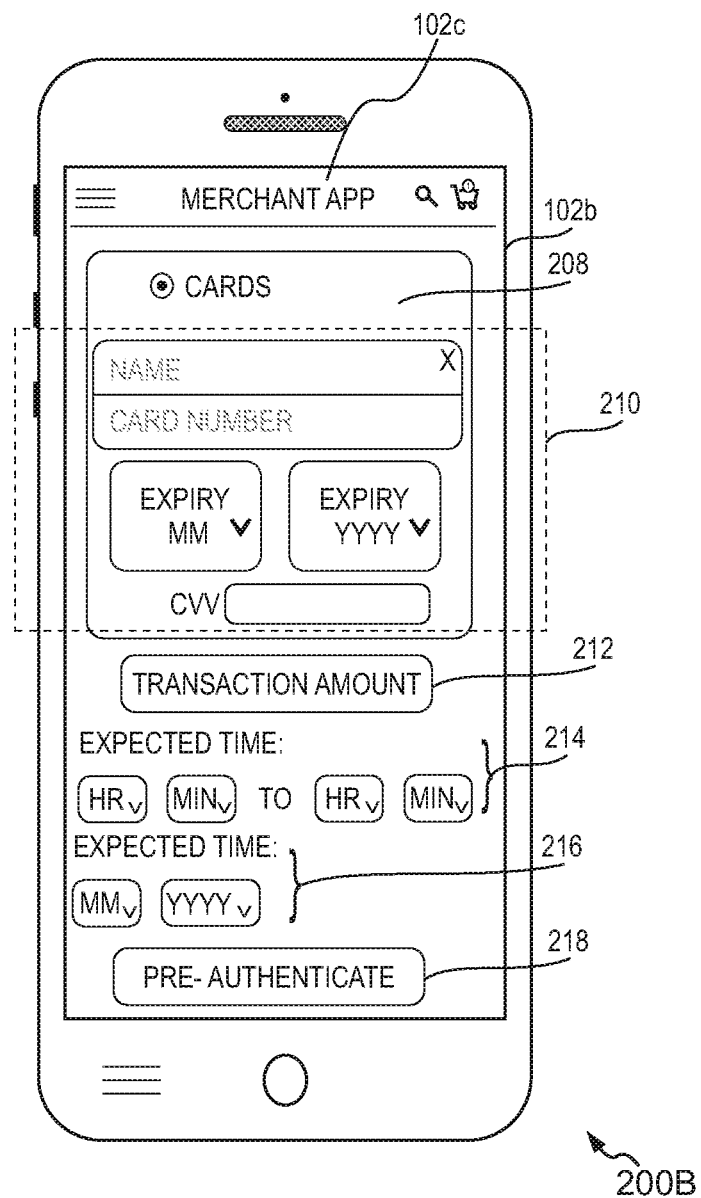

FIGS. 2A and 2B collectively represent corresponding User Interfaces (UIs) 200A and 200B for generating a pre-authentication request signal for processing a prospective e-commerce transaction at an expected transaction time, in accordance with an example embodiment. More specifically, FIG. 2A represents a UI 200A displayed by the merchant application 102c enlisting a number of payment methods for user selection to initiate pre-authentication of a prospective e-commerce transaction on the user device 102a (e.g., a smartphone). A header 202 displaying text 'pre-authenticate a prospective e-commerce transaction using:' is accompanied by a plurality of payment methods 204 exemplarily displayed as 'cards', 'wallets', and 'net banking'. The UI 200A displays a user selection of the payment method 'cards'. In an alternate embodiment, the user 102 may first select 'wallets' as a preferred payment method and then may be directed to a UI of the wallet application using which a preferred payment card may be selected or a prepaid wallet account may be selected by the user 102 to initiate pre-authentication of the prospective e-commerce transaction. The user 102 may click a button 206 labeled as 'submit' to submit the selection of 'cards' as the preferred payment method.

Next, the user 102 is directed to a UI 200B shown to display a header 208 displaying text 'cards'. The header 208 is accompanied by a plurality of form fields and a plurality of selectable icons to be filled/selected by the user 102. The plurality of form fields and the plurality of selectable icons may collectively be referred to hereinafter as a payment card data 210 of the payment card. The payment card data 210 includes a name of the cardholder (an example of the form field), a payment card number (e.g., xxxx xxxx xxxx xxxx where 'x' is an integral number) of the payment card (an example of the form field), an expiry date (e.g., MM/YYYY, month and year of expiry) (an example of the selectable icon), a CVV number (e.g., *** where * is an integral number) (an example of the form field) and the like. Alternatively, the payment card data 210 may include information such as cardholder's payment account number, or any identification number associated with the payment card.

Further, the UI 200B displays a form field 212 to enable the user 102 to enter a transaction amount data. A selectable icon 214 is displayed for user selection of expected transaction time period (e.g., HH/MIN to HH/MIN, hours and minutes) for performing the prospective e-commerce transaction. Yet another selectable icon 216 is displayed for user selection of an expected date (e.g., MM/YYYY, month and year) for performing the prospective e-commerce transaction.

For example, after entering the payment card data 210 of the payment card, the user 102 may enter the transaction amount data as 10000 INR, the expected transaction time period as 5.00 pm to 7.30 pm and the expected date as 31 Dec. 2019 for performing the prospective e-commerce transaction. Thereafter, the user 102 may click a button 218 labeled as 'pre-authenticate' to submit the entered data on the merchant application 102c. The submission of the data results in generation of a pre-authentication request signal that includes a time data for an expected transaction time, a transaction amount data, a payment card data 210 of the payment card and at least one transaction identifier data. The examples of the transaction identifier data include a merchant ID, a prospective e-commerce transaction reference number, an e-commerce application login ID of the user 102, a wallet application login ID of the user 102, an e-commerce application Universal Resource Locator (URL), a wallet application URL and the like.

Figure 3:
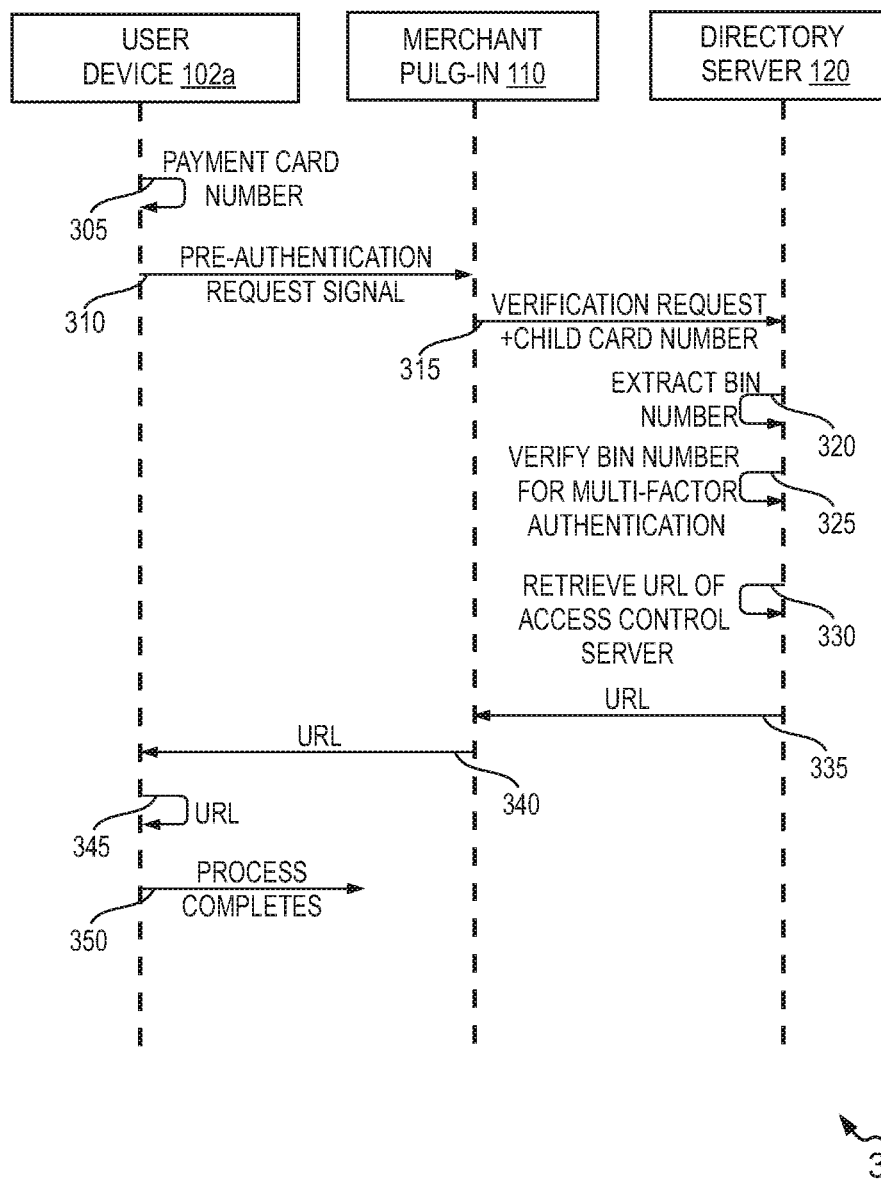
FIG. 3 represents a sequence flow diagram representing verification of an access control server participated for performing a multi-factor pre-authentication for the prospective e-commerce transaction, in accordance with an example embodiment.

FIG. 3 represents a sequence flow diagram 300 representing verification of an access control server 125 participated for performing multi-factor pre-authentication for the prospective e-commerce transaction, in accordance with an example embodiment.

At 305, the merchant application 102c running on the user device 102a sends the pre-authentication request signal to the MPI 110. The MPI 110 extracts the payment card data from the pre-authentication request signal.

At 310, the MPI 110 sends a verification request along with the payment card number retrieved from the payment card data to the directory server 120 to verify if the ACS 125 has participated for performing pre-authentication. The Verification Request/Response (VEReq/VERes) messages are sent from the MPI 110 to the directory server 120 to check card range eligibility. The directory server 120 includes a list of Bank Identifier Numbers (BINs). A BIN, in an example, is the initial four to six numbers that appear on a credit card. The BIN uniquely identifies the institution issuing the card. The BIN is key in the process of matching transactions to the issuer of the charged card. In one embodiment, each BIN is stored against each of one or more corresponding URLs of each of one or more ACSs participating for performing pre-authentication.

At 315, the directory server 120 extracts corresponding BIN from the payment card number. At 320, the directory server 120 verifies if the ACS 125 has been enrolled for performing pre-authentication using the BIN. Upon successful verification, at 325, the directory server 120 retrieves the corresponding URL of the ACS 125.

At 330, the directory server 120 sends the corresponding URL to the MPI 110. At 335, the MPI 110 sends the URL to the user device 102a. At 340, The browser of the user device 102a reads the URL. The process completes at 345.

Figure 4:
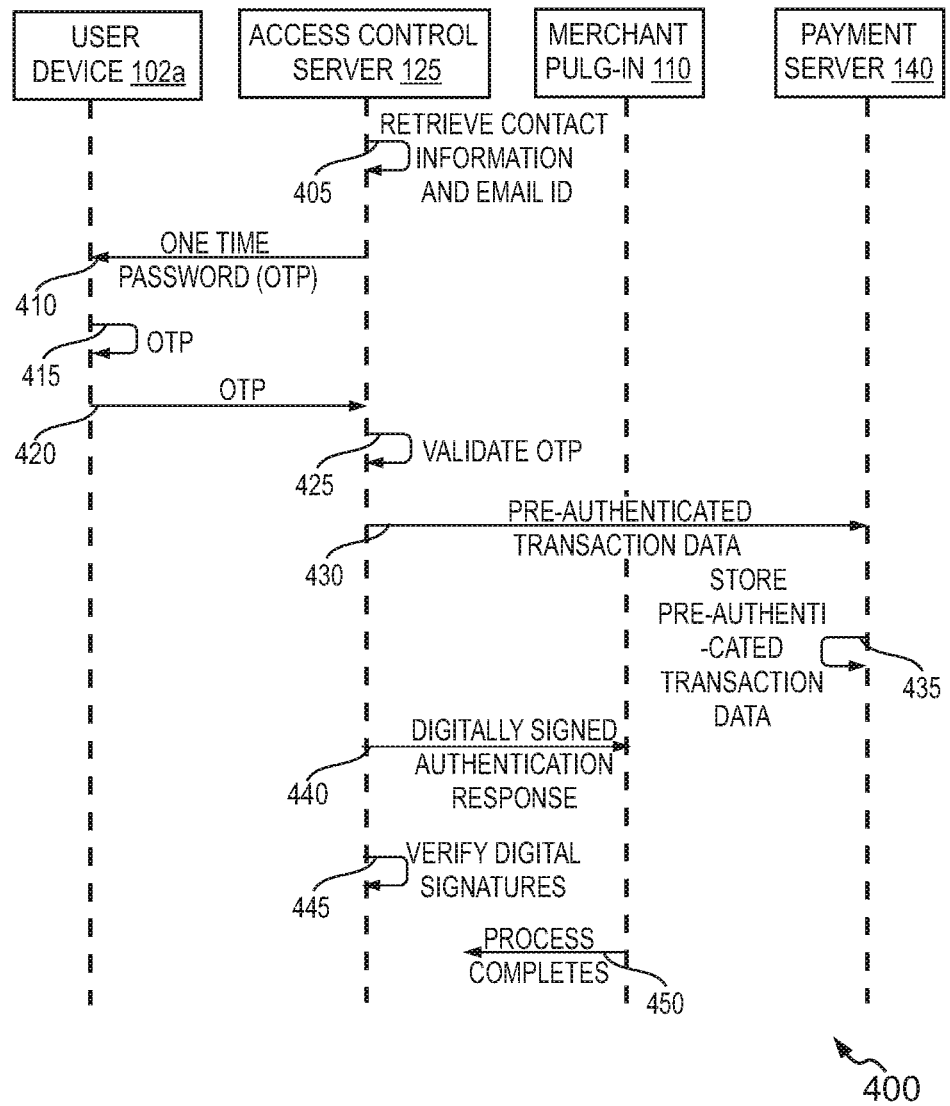
FIG. 4 represents a sequence flow diagram representing multi-factor pre-authentication performed by the access control server for the prospective e-commerce transaction, in accordance with an example embodiment.

FIG. 4 represents a sequence flow diagram 400 representing multi-factor pre-authentication performed by the access control server 125 for the prospective e-commerce transaction, in accordance with an example embodiment. As explained with reference to FIG. 3, once the browser of the user device 102a reads the URL, the browser sends a request to load corresponding User Interfaces (UIs) to the ACS 125.

Upon receiving such a request, at 405, the ACS 125 retrieves a contact information of the user 102 associated with the payment card from a database. For example, the mobile number and the email ID of the user 102 may be retrieved.

At 410, the ACS 125 sends an OTP to the contact information of the user 102. For example, the user 102 may have logged in his email via a browser running on the desktop computer 102a on which he may be able to receive the email and access the OTP. Alternatively, if the user 102 is checking out from a mobile application of a merchant using his smartphone, he may be able to access the OTP sent from the ACS 125 in the SMS application and/or the email application present in the smartphone.

At 415, the OTP is entered by the user 102 on a corresponding UI displayed on the user device 102a. At 420, the OTP is received by the ACS 125. At 425, the ACS 125 validates the OTP entered by the user 102 by matching with the OTP that was sent.

Upon successful validation, at 430, the ACS 125 sends a pre-authenticated transaction data to the payment server 140. The pre-authenticated transaction data includes the time data for the expected transaction time, the transaction amount data, the payment card data of the payment card and the at least one transaction identifier data.

At 435, the payment server 140 stores the pre-authenticated transaction data in a database. In at least one embodiment, the payment server 140 is configured to use the pre-authenticated transaction data for verification of the pre-authentication when the actual e-commerce transaction happens at the expected transaction time in the future. Only after successful verification of the pre-authentication, the actual e-commerce transaction is completed.

At 440, the ACS 125 sends a digitally signed authentication response of successfully performed pre-authentication to the MPI 110. Alternatively, the response may first be sent to the payment server 140 along with the pre-authenticated transaction data and the payment server 140 may forward the response to the MPI 110. At 445, the MPI 110 verifies the digital signatures and initiates a pre-authorization of the payment card. The pre-authentication process completes at 450.

Figure 5:
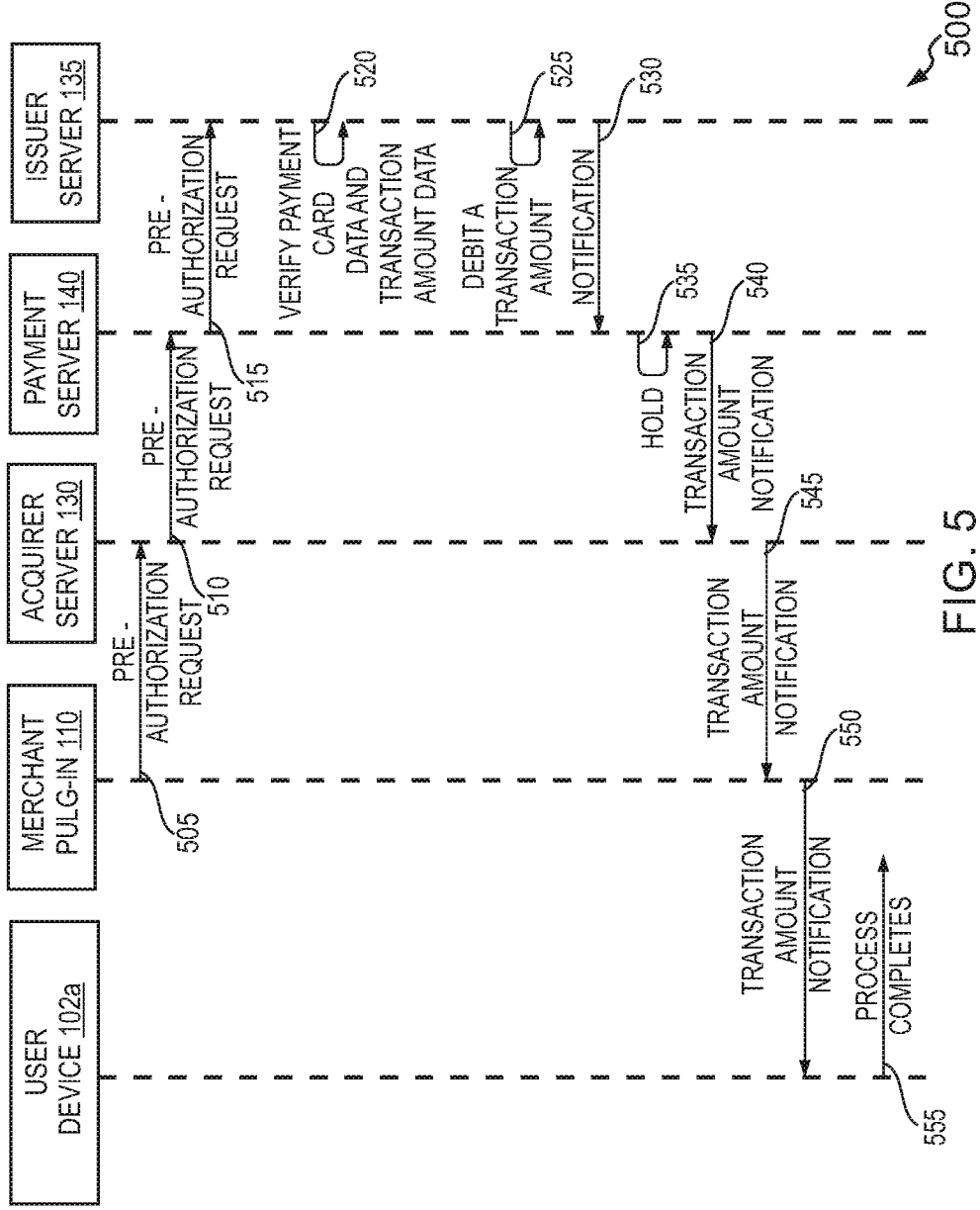
FIG. 5 represents a sequence flow diagram representing a pre-authorization of a payment card for the prospective e-commerce transaction, in accordance with an example embodiment.

FIG. 5 represents a sequence flow diagram 500 representing a pre-authorization of a payment card for the prospective e-commerce transaction, in accordance with an example embodiment.

At 505, the MPI 110 sends a pre-authorization request to the acquirer server 130 of the merchant. At 510, the acquirer server 130 sends the pre-authorization request to the payment server 140. The pre-authorization request includes the payment card data 210 of the payment card and the transaction amount data (as entered in the form field 212 of the UI 200B). The acquirer server 130 also determines the acquirer account of the merchant and sends the acquirer account details to the payment server 140.

At 515, the payment server 140 sends the pre-authorization request to the issuer server 135. Further, the payment server 140 identifies the merchant using the acquirer details received from the acquirer server 130 for processing the prospective e-commerce transaction at the expected transaction time in the future.

At 520, the issuer server 135 performs pre-authorization of the payment card data and the transaction amount data by verifying the card information of the payment card, available balance amount in the user's account against the received transaction amount data, issuer account information and the like. Some non-exhaustive examples of the issuer account information include Bank Identifier Code (BIC), account number, payment card number and the like.

At 525, the issuer server 135 debits a transaction amount (that is equal to the transaction amount data) from the user's account. At 530, the issuer server 135 sends a notification of debiting of the transaction amount to the payment server 140 via the payment network 145. At 535, the payment server 140 holds the transaction amount for processing the prospective transaction at the expected transaction time. At 540, the payment server 140 sends a notification signal of successful pre-authentication (and pre-authorization) to the acquirer server 130. At 545, the acquirer server 130 forwards the notification signal to the MPI 110. At 550, the MPI 110 forwards the notification signal to the user device 102a via the merchant application 102c. The process completes at operation 555.

Thus, an authentication and authorization of any e-commerce payment transaction, as explained collectively with reference to FIG. 3 to FIG. 5, requires communication among a plurality of entities via the payment network 145. This is a time-consuming process specifically for scenarios where a transaction needs to be completed within a certain amount of time period. For example, when a user is trying to book an online air ticket from an airline website, the checkout page of the airline website displays a timer showing a time limit till which the transaction needs to be completed. If during the authentication process, the communication link among one of the servers fails, the payment transaction is aborted and all the user preferences for the chosen flight get vanished. The user needs to restart the whole process and it may happen that the flight prices may have gone up or the pre-selected seat may have been taken up by someone else next time when the user tries to book the online air ticket.

In such scenarios, if the user is given an option on the airline website to pre-authenticate a future transaction by paying an approximate transaction amount as explained with reference to the foregoing figures, the user will not need to keep track of the timer to complete the transaction and his flight preferences also will be maintained. The communication among the servers to process the pre-authenticated prospective e-commerce transaction at the expected transaction time (provided in advance) is explained hereinafter with reference to FIG. 6 and FIG. 7.

Figure 6A:
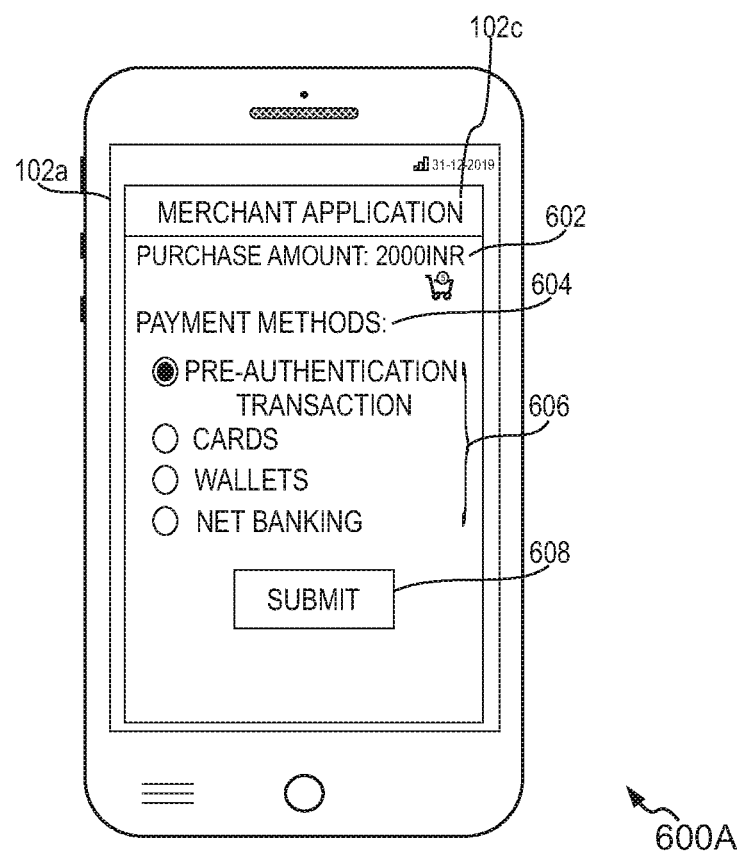
FIGS. 6A and 6B collectively represent corresponding user interfaces for generating an e-commerce transaction request signal for processing the pre-authenticated e-commerce transaction at the expected transaction time, in accordance with an example embodiment.
Figure 6B:
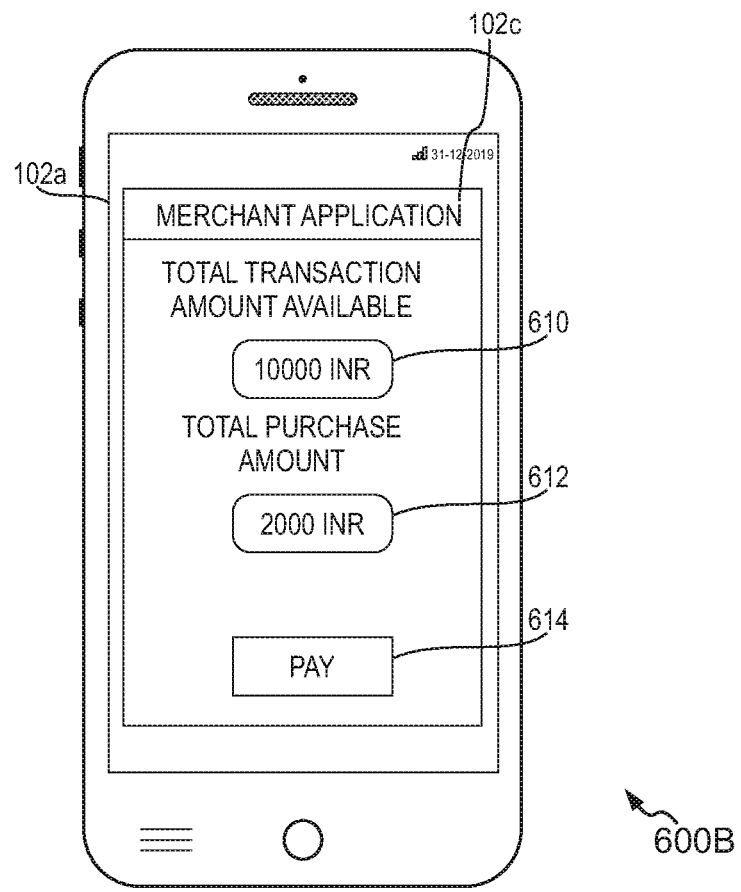

FIGS. 6A and 6B collectively represent corresponding UIs for generating an e-commerce transaction request signal for processing the pre-authenticated e-commerce transaction at the expected transaction time, in accordance with an example embodiment. Considering the example explained with reference to FIG. 2, for a pre-authenticated prospective transaction of the transaction amount 10000 INR, the user 102 is expected to login to the merchant application 102c at any time between 5.00 pm to 7.30 pm (an example of the time data/time period data of the expected transaction time) on 31 Dec. 2019 (the expected date) for performing the prospective e-commerce transaction. The user 102 is required to use the same login account/ID to select the pre-authenticated transaction that he used to generate the pre-authentication request earlier. This is why the login ID of the user 102 needs to be maintained in a database for verification purposes.

FIG. 6A represents a UI 600A being a checkout page of the merchant application 102c running on the user device 102a (e.g., a smartphone) at 6.30 pm on the date 31 Dec. 2019. As shown in a cart icon, the user 102 has selected five items to be purchased using the merchant application 102c. The purchase amount for all five items is displayed as 2000 INR (see, 602). The UI 600A further enlists a number of payment methods for user selection for purchasing the selected items. A header 604 displaying text 'payment methods' is accompanied by a plurality of payment methods 606 exemplarily displayed as 'pre-authenticated transaction' 'cards', 'wallets', and 'net banking'. The UI 600A displays a user selection of the payment method 'pre-authenticated transaction'.

In an alternate embodiment, if the user 102 had selected 'wallets' as a preferred payment method to initiate pre-authentication of the prospective e-commerce transaction, then the user 102 would first select 'wallets' as the payment method on the UI 600A. Thereafter, the user 102 may be directed to a UI displayed by the wallet application using which he may be enabled to select 'pre-authenticated transaction' as the preferred payment method to purchase the selected items.

The user 102 clicks a button 608 labeled as 'submit' to submit the selection of 'pre-authenticated transaction' as the preferred payment method using the UI 600A. The user 102 is next directed to a UI 600B showing the time 6.32 pm and date 31 Dec. 2019 on the user device 102a. The UI 600B displays an information field 610 as total transaction amount available (i.e., 10000 INR) and an information field 612 as total purchase amount (i.e., 2000 INR). The user 102 clicks a button 614 labeled as 'pay' to initiate processing of the pre-authenticated e-commerce transaction. Clicking of the button 614 results in generation of an e-commerce transaction request signal. The e-commerce transaction request signal is sent by the merchant application 102c to the MPI 110. The processing steps of the pre-authenticated e-commerce transaction are explained in detail hereinafter with reference to FIG. 7.

Figure 7:
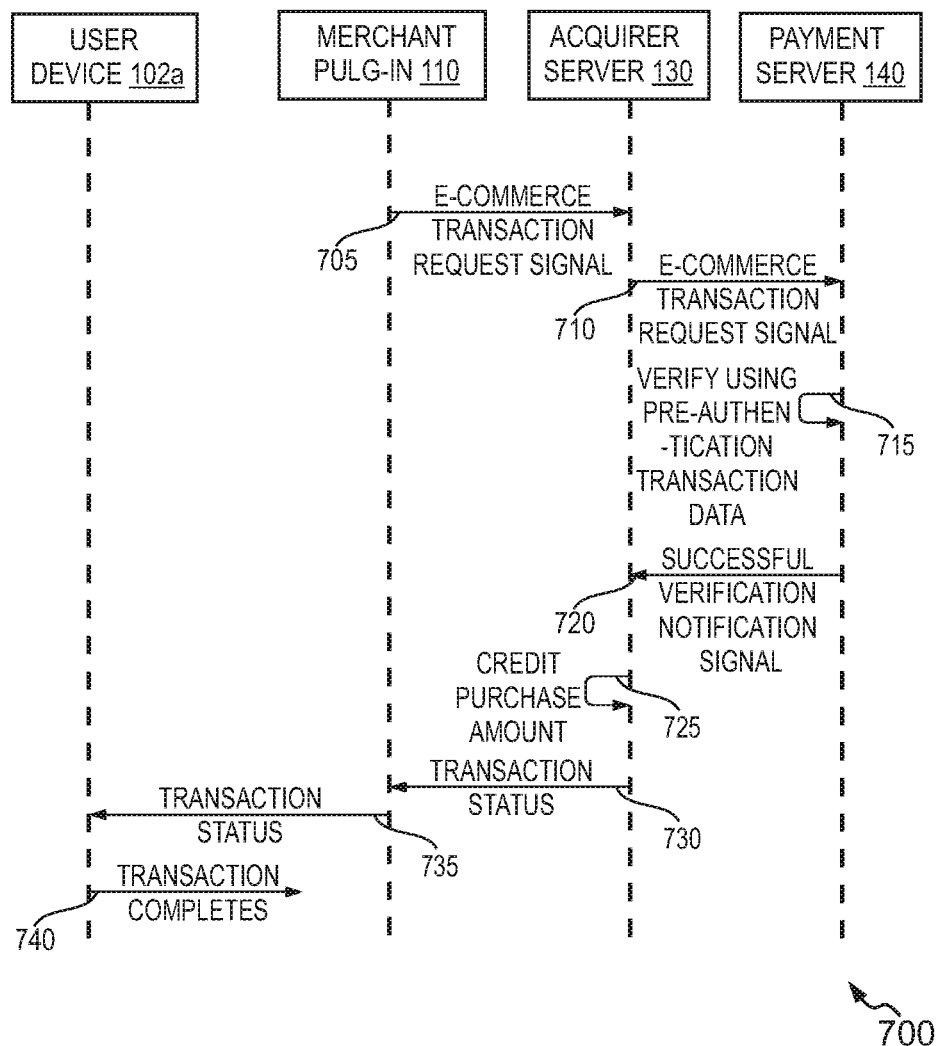
FIG. 7 represents a sequence flow diagram representing processing of the pre-authenticated e-commerce transaction at the expected transaction time, in accordance with an example embodiment.

FIG. 7 represents a sequence flow diagram 700 representing processing of the pre-authenticated e-commerce transaction at the expected transaction time, in accordance with an example embodiment.

At 705, the MPI 110 sends the e-commerce transaction request signal to the acquirer server 130. The e-commerce transaction request signal includes a purchase amount data (i.e., 2000 INR) and the at least one transaction identifier data (e.g., the merchant identifier and the log in ID of the user 102 on the merchant application 102c).

At 710, the acquirer server 130 sends the e-commerce transaction request signal to the payment server 140. The purchase amount data and the transaction identifier data are retrieved by the payment server 140 from the e-commerce transaction request signal. The payment server 140 does not have to send the e-commerce transaction request signal all the way to the issuer server 135 for authorization and authentication approval, rather the payment server 140 looks into its own database, to see if some prepaid amount is maintained with the payment gateway that can be used for processing the pre-authenticated e-commerce transaction.

At 715, the payment server 140 verifies the pre-authentication of the e-commerce transaction using the pre-authenticated transaction data that has been stored in a database at the time of pre-authenticating the prospective e-commerce transaction previously. The transaction identifier data received in the e-commerce transaction request signal is matched against the transaction identifier data stored under the pre-authenticated transaction data. The payment server 140 verifies information such as, but not limited to, a time data for an expected transaction time, a transaction amount data, a payment card data of the payment card, a merchant ID, a prospective e-commerce transaction reference number, an e-commerce application login ID of the user 102, an e-commerce application URL and the like. Further, if the user 102 has used a wallet application for pre-authenticating a prospective transaction and later for processing the pre-authenticated transaction at the expected transaction time/time period, then a wallet application login ID of the user 102 and a wallet application URL are also verified by the payment server 140.

As shown by the UIs 600A and 600B, the user 102 has logged in the merchant application 102c at 6.30 pm that is between the expected transaction time period of 5.0 pm to 7.30 pm to process the pre-authenticated transaction. The payment server 140 verifies that the e-commerce transaction request signal is generated at 6.30 pm based on matching with the expected transaction time period of 5.0 pm to 7.30 pm (an example of the pre-authenticated transaction data) and as the verification is successful, the transaction is processed further.

At 720, the acquirer server 130 credits the purchase amount (that is equal to the purchase amount data) in the merchant account. The purchase amount (e.g., 2000 INR) is debited from the transaction amount (e.g., 10000 INR) held by the payment server 140 at a previous time during the pre-authentication.

At 725, the acquirer server 130 sends a transaction status of the pre-authenticated e-commerce transaction to the MPI 110. The transaction status may include successful, failure or pending. At 730, the MPI 110 sends the transaction status on the user device 102a via the merchant application 102c. The pre-authenticated e-commerce transaction process completes at operation 735.

Thus, as the e-commerce transaction has been pre-authenticated at a previous time, the actual time it takes to complete the transaction at the expected time reduces tremendously. Further, as the payment server 140 holds and manages the transaction amount in an e-wallet at the back end, the merchant is sparred from maintaining such e-wallets for his own e-commerce application. This results in reduction of the operational cost to be spent by the merchant for maintaining the e-wallet at his end. The merchant is only required to facilitate a UI for enabling a user 102 to make a pre-authentication transaction request and a UI for receiving a user input for processing a pre-authenticated transaction at the actual time. The underlying steps are performed and managed by the payment server 140 associated with a payment gateway/the payment network 145 such that the checkout experience of the user 102 is enhanced and the merchant is relieved from managing a self-developed e-wallet.

Figure 8:
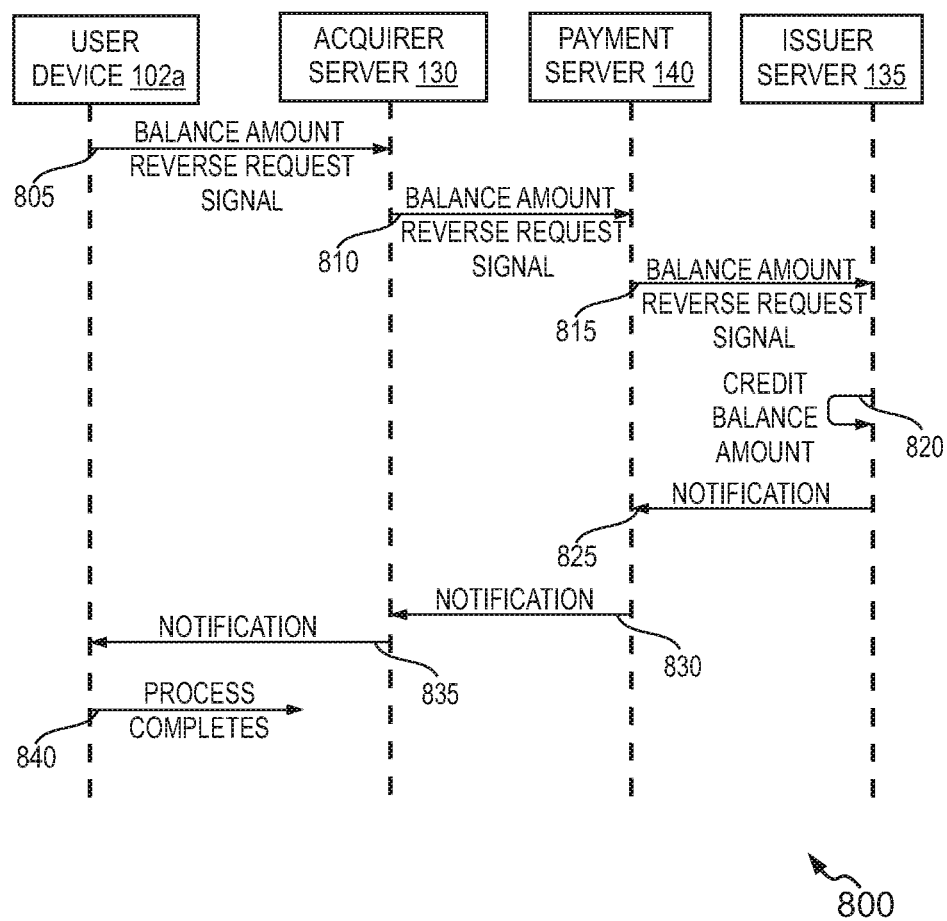
FIG. 8 represents a sequence flow diagram representing processing of a balance amount reversal, in accordance with an example embodiment.

FIG. 8 represents a sequence flow diagram 800 representing processing of a balance amount reversal, in accordance with an example embodiment. Once the pre-authenticated transaction is completed, a balance amount (i.e., difference of the purchase amount (e.g., 2000 INR) and the transaction amount (e.g., 10000 INR)) are displayed on a UI (not shown) by the merchant application 102c. The user 102 is further enabled to provide a user input for requesting reversal of the balance amount. As shown in the UI 600B, the balance amount for the processed pre-authenticated e-commerce transaction is 8000 INR.

At 805, the merchant application 102c running on the user device 102a sends a balance amount reversal request signal to the acquirer server 130 via the MPI 110 (not shown). The balance amount reversal request signal includes a balance amount data (e.g., 8000 INR) to be reversed.

At 810, acquirer server 130 sends the balance amount reversal request signal to the payment server 140. At 815, the payment server 140 sends a command to reverse the balance amount to the issuer server 135.

At 820, the issuer server 135 credits the balance amount to the issuer account of the user 102. The balance amount is credited based on receiving the balance amount back from the payment server 140 held during the pre-authentication process.

At 825, the issuer server 135 sends a notification signal of successful reversal of the balance amount to the payment server 140. At 830, the payment server 140 forwards the notification signal to the acquirer server 130. At 835, the acquirer server 130 forwards the notification signal to the user device 102a through the MPI 110 via the merchant application 102c. The balance amount reversal process completes at operation 840.

Figure 9:
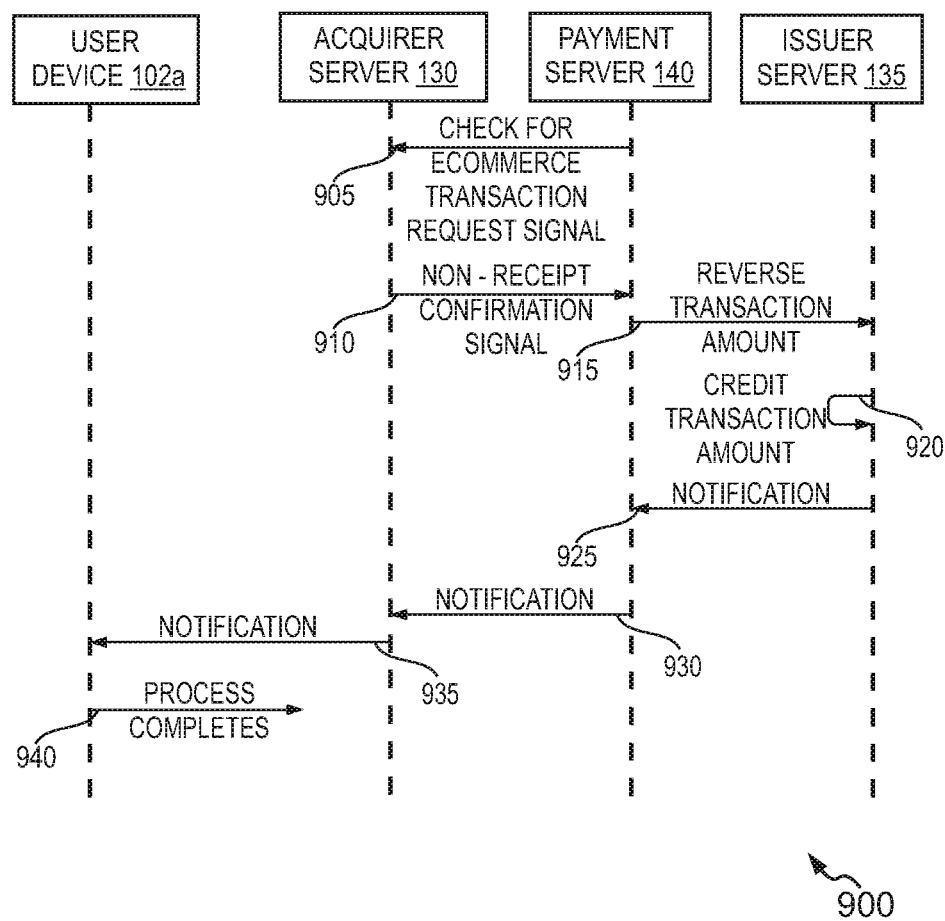
FIG. 9 represents a sequence flow diagram representing processing of a transaction amount reversal, in accordance with an example embodiment.

FIG. 9 represents a sequence flow diagram 900 representing processing of a transaction amount reversal, in accordance with an example embodiment. As explained with reference to FIG. 4, the payment server 140 is configured to receive the pre-authenticated transaction data from the ACS 125 after the pre-authentication has been completed successfully. The pre-authenticated data is stored in the database of the payment server 140. Among other parameters, the pre-authenticated data includes time data of the expected transaction time/time-period when the user 102 is willing to process the prospective e-commerce transaction.

At 905, the payment server 140 checks for a receipt of the e-commerce transaction request signal with the acquirer server 130. The payment server 140 is configured to use the time data parameter to check with the acquirer server 130 for the receipt of the e-commerce transaction request signal. If it is a time-period, the payment server 140 continuously checks during that time period for the receipt of the e-commerce transaction request signal.

At 910, the payment server 140 receives a non-receipt confirmation signal from the acquirer server 130. It means that the user 102 has not logged in the merchant application 102c at the mentioned/expected transaction time to process the pre-authenticated e-commerce transaction.

At 915, the payment server 140 sends a command of transaction amount reversal to the issuer server 135. This is performed automatically based on receiving the non-receipt confirmation signal from the acquirer server 130 without waiting for any user input to request reversal of the transaction amount. This feature ensures that the user's money i.e., the transaction amount is not held for an unlimited time period only because it is under a pre-authenticated transaction. Therefore, if the user 102 fails to perform the prospective transition at the expected transaction time for some reason, he is still entitled to receive his money back without manually asking for it.

At 920, the issuer server 135 credits the transaction amount back to the issuer account of the user 102. The transaction amount is credited back to the issuer account based on receiving the transaction amount held by the payment server 140.

At 925, the issuer server 135 sends a notification signal of successful reversal of the transaction amount (i.e., transaction amount reversal response signal) to the payment server 140. At 930, the payment server 140 forwards the notification signal to the acquirer server 130. At 935, the acquirer server 130 forwards the notification signal to the user device 102a through the MPI 110 via the merchant application 102c. The transaction amount reversal process completes at operation 940.

For example, a user logs in to an Indian Railway Catering and Tourism Corporation (IRCTC) website to pre-authenticate a prospective transaction for purchasing a tatkal railway ticket online. For instance, the tatkal booking opens at certain time every day, a day in advance of actual date of journey. Therefore, the user may enter a transaction amount data, an appropriate date data and a time data according to that for pre-authenticating a future transaction of tatkal booking. However, after logging into the website at the selected date and time, the user may come to know that all the tatkal tickets are sold out at that moment for his preference of the travel route and therefore his pre-authenticated transaction remains unused. In such a situation, the payment server 140 generates the command of transaction amount reversal request automatically and the transaction amount gets credited back to the issuer account.

Figure 10:
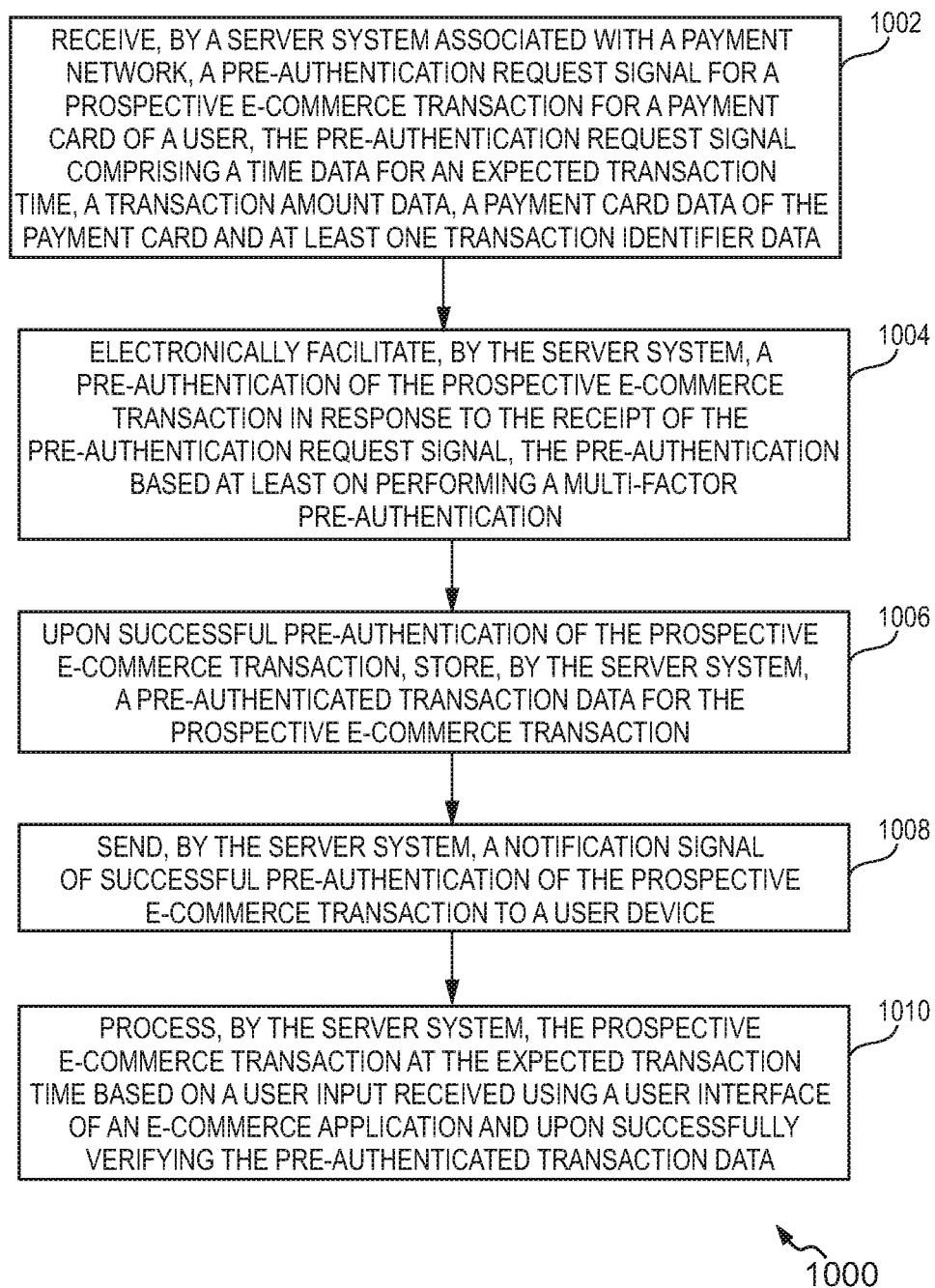
FIG. 10 illustrates a flow diagram of a method for enhancing checkout experience of an e-commerce transaction, in accordance with an example embodiment.

FIG. 10 illustrates a flow diagram of a computer implemented method 1000 for enhancing checkout experience of an e-commerce transaction, in accordance with an example embodiment. More specifically, the method 1000 for enabling pre-authentication of a prospective e-commerce transaction is disclosed. The method 1000 depicted in the flow diagram may be executed by, for example, the at least one server system such as the acquirer server 130, the issuer server 135, the merchant server 115, the directory server 120, the ACS 125, the wallet server 155 and the payment server 140 explained with reference to FIG. 1. Operations of the method 1000, and combinations of operation in the method 1000, may be implemented by, for example, hardware, firmware, a processor, circuitry and/or a different device associated with the execution of software that includes one or more computer program instructions. The operations of the method 1000 are described herein with help of the server systems 130, 135, 120, 125, 115, 155 or 140. It is noted that the operations of the method 1000 can be described and/or practiced by using a system other than these server systems. The method 1000 starts at operation 1002.

At 1002, the method 1000 includes receiving, by a server system associated with a payment network 145, a pre-authentication request signal for a prospective e-commerce transaction for a payment card of a user 102. The pre-authentication request signal includes a time data for an expected transaction time, a transaction amount data, a payment card data of the payment card and at least one transaction identifier data.

At 1004, the method 1000 includes, electronically facilitating, by the server system, a pre-authentication of the prospective e-commerce transaction in response to the receipt of the pre-authentication request signal. The pre-authentication is based at least on performing a multi-factor pre-authentication.

Upon successful pre-authentication of the prospective e-commerce transaction, at 1006, the method 1000 includes storing, by the server system, a pre-authenticated transaction data for the prospective e-commerce transaction.

At 1008, the method 1000 includes sending, by the server system, a notification signal of successful pre-authentication of the prospective e-commerce transaction to a user device.

At 1010, the method 1000 includes processing, by the server system, the prospective e-commerce transaction at the expected transaction time based on a user input received using a user interface of an e-commerce application and upon successfully verifying the pre-authenticated transaction data. The method 1000 stops at operation 1010. The user input generates an e-commerce transaction request signal to process the pre-authenticated prospective e-commerce transaction at the expected transaction time.

Figure 11:
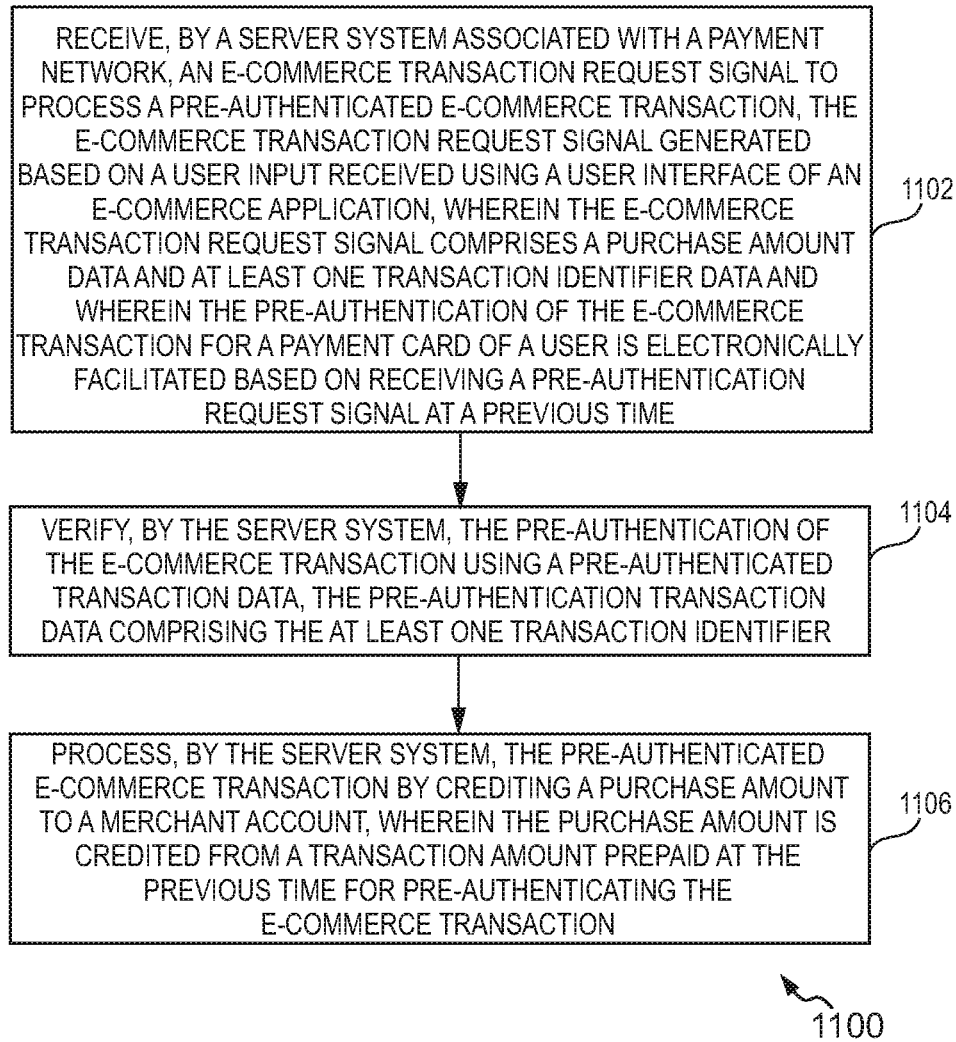
FIG. 11 illustrates a flow diagram of another method for enhancing checkout experience of an e-commerce transaction, in accordance with an example embodiment.

FIG. 11 illustrates a flow diagram of another method 1100 for enhancing checkout experience of an e-commerce transaction, in accordance with an example embodiment. More specifically, the method 1100 for processing a pre-authenticated e-commerce transaction is disclosed. The method 1100 depicted in the flow diagram may be executed by, for example, the at least one server system such as the acquirer server 130, the issuer server 135, the merchant server 115, the directory server 120, the ACS 125, the wallet server 155 and the payment server 140 explained with reference to FIG. 1. Operations of the method 1100, and combinations of operation in the method 1100, may be implemented by, for example, hardware, firmware, a processor, circuitry and/or a different device associated with the execution of software that includes one or more computer program instructions. The operations of the method 1100 are described herein with help of the server systems 130, 135, 120, 125, 115, 155 or 140. It is noted that the operations of the method 1100 can be described and/or practiced by using a system other than these server systems. The method 1100 starts at operation 1102.

At 1102, the method 1100 includes receiving, by a server system associated with a payment network 145, an e-commerce transaction request signal to process a pre-authenticated e-commerce transaction. The e-commerce transaction request signal is generated based on a user input received using a user interface of an e-commerce application. The e-commerce transaction request signal includes a purchase amount data and at least one transaction identifier data. The pre-authentication of the e-commerce transaction for a payment card of a user 102 is electronically facilitated based on receiving a pre-authentication request signal at a previous time. The pre-authentication request signal includes a time data for an expected transaction time, a transaction amount data, a payment card data of the payment card and the at least one transaction identifier data. Pre-authenticating the e-commerce transaction includes performing a multi-factor pre-authentication.

At 1104, the method 1100 includes, verifying, by the server system, the pre-authentication of the e-commerce transaction using a pre-authenticated transaction data. The pre-authentication transaction data includes the at least one transaction identifier.

At 1106, the method 1100 includes processing, by the server system, the pre-authenticated e-commerce transaction by crediting a purchase amount to a merchant account. The purchase amount is credited from a transaction amount prepaid at the previous time for pre-authenticating the e-commerce transaction. The method 1100 stops at operation 1106.

Figure 12:
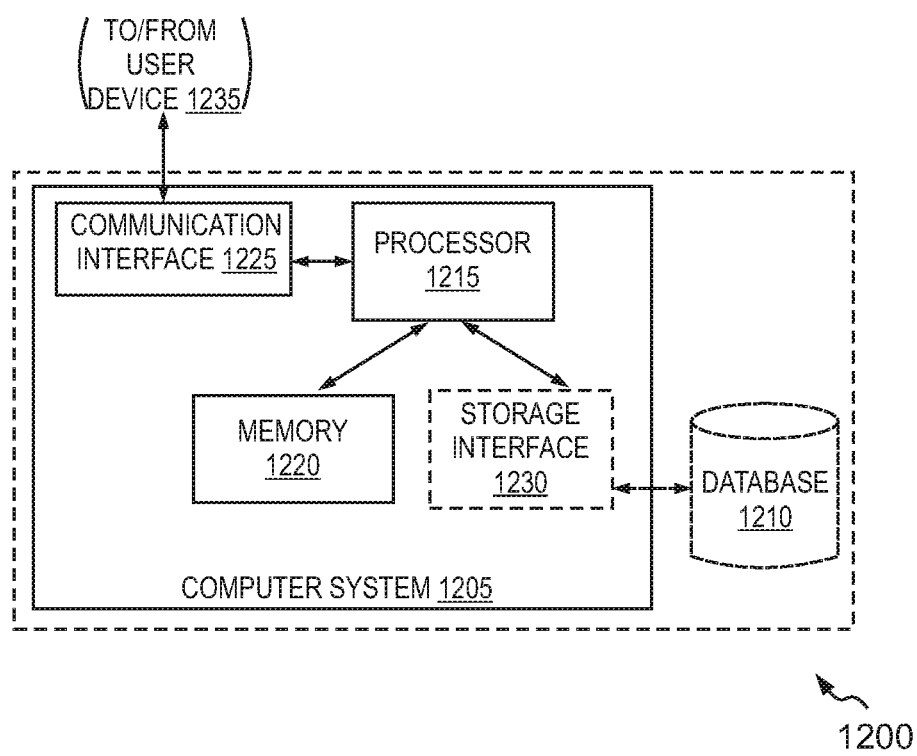
FIG. 12 is a simplified block diagram of a server system, in accordance with one embodiment of the present disclosure.

FIG. 12 is a simplified block diagram of a server system 1200, in accordance with one embodiment of the present disclosure. Examples of the server system 1200 include, but are not limited to, the acquirer server 130, the issuer server 135, the merchant server 115, the directory server 120, the access control server 125, the wallet server 155 and the payment server 140. The server system 1200 includes a computer system 1205 and a database 1210.

The computer system 1205 includes at least one processor 1215 for executing instructions. Instructions may be stored in, for example, but not limited to, a memory 1220. The processor 1215 may include one or more processing units (e.g., in a multi-core configuration). The processor 1215 is operatively coupled to a communication interface 1225 such that the computer system 1205 is capable of communicating with a remote device such as a user device 1235 (e.g., the user device 102a) or communicating with any entity within the payment network 145.

The processor 1215 may also be operatively coupled to the database 1210. The database 1210 is any computer-operated hardware suitable for storing and/or retrieving data, such as, but not limited to, transaction data generated as part of sales activities conducted over the bankcard network including data relating to merchants, account holders or customers, and purchases. The database 1210 may also store information related to a plurality of users' payment accounts. Each user account data includes at least one of a user name, a user address, an account number, a contact information, PIN, and other account identifiers. The database 1210 may also store device identifiers, platform IDs of the users etc.

The database 1210 may also store a merchant identifier that identifies each merchant registered to use the payment network 145, and instructions for settling transactions including merchant bank account information (e.g., a plurality of payment accounts related to the merchant interfaces associated with merchants). The database 1210 may further include issuer account information, BINs, URLs of the access control servers, pre-authentication request signal, pre-authenticated transaction data, transaction identifier data etc. The database 1210 may include multiple storage units such as hard disks and/or solid-state disks in a redundant array of inexpensive disks (RAID) configuration. The database 1210 may include a storage area network (SAN) and/or a network attached storage (NAS) system.

In some embodiments, the database 1210 is integrated within the computer system 1205. For example, the computer system 1205 may include one or more hard disk drives as the database 1210. In other embodiments, the database 1210 is external to the computer system 1205 and may be accessed by the computer system 1205 using a storage interface 1230. The storage interface 1230 is any component capable of providing the processor 1215 with access to the database 1210. The storage interface 1230 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1215 with access to the database 1210.

The processor 1215 is configured to receive a pre-authentication request signal from the user device 1235 for performing a prospective e-commerce transaction at an expected transaction time via the communication interface 1225. The processor 1215 is configured to identify an Access Control Server (ACS) participating for pre-authentication using a payment card number of the payment card. The corresponding URL of the identified ACS is retrieved from the database 1210 by the processor 1215. The processor 1215 is configured to provide a user interface on the user device 1235 to enable a user 102 to enter a One-time Password (OTP) sent by the processor 1215 to the associated contact information of the user 102 for performing pre-authentication. The contact information is associated with the payment card and stored in the database 1210.

Further, the pre-authorization of the payment card data and a transaction amount data is also performed by the processor 1215. The processor 1215 is configured to validate the payment card data using the associated card information stored in the database 1210. The processor 1215 is further configured to approve the transaction amount data by verifying against the available balance in the issuer account of the user 102, as stored in the database 1210. In an embodiment, the processor 1215 is configured to notify the user device 1235 of successful pre-authentication via the communication interface 1225. Further, the processor 1215 is configured to receive an e-commerce transaction request signal to process the pre-authenticated e-commerce transaction at the expected transaction time. The processor 1215 is configured to verify pre-authentication of the e-commerce transaction using the pre-authenticated transaction data stored in the database 1210. The processor 1215 is configured to complete the pre-authenticated e-commerce transaction by crediting a purchase amount from the transaction amount prepaid at a previous time to a merchant account.

Figure 13:
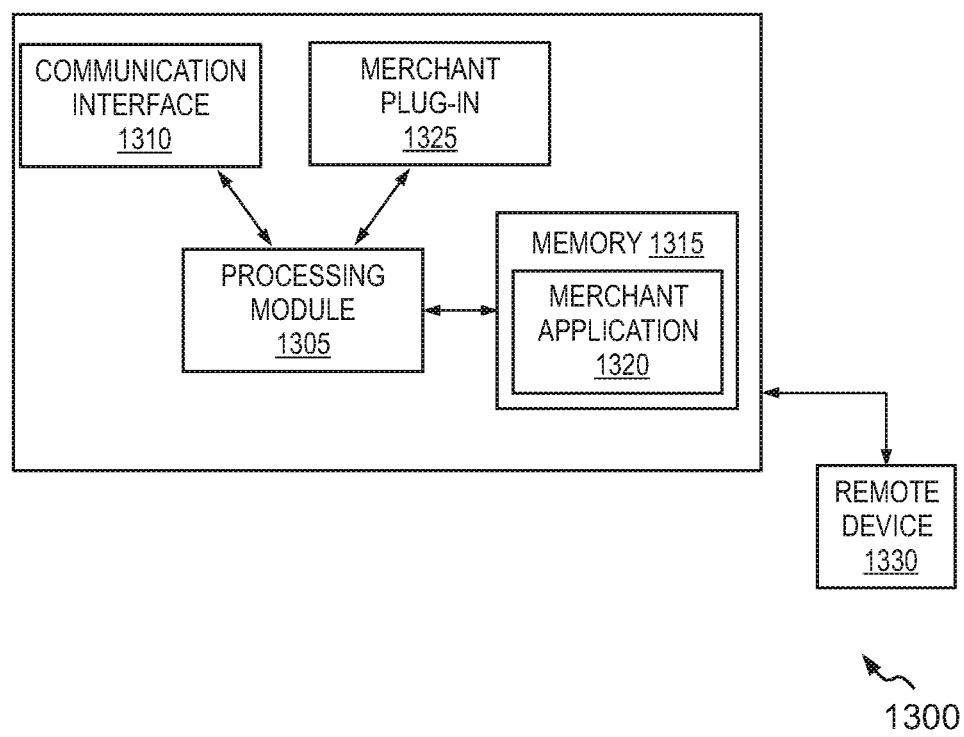
FIG. 13 is a simplified block diagram of a merchant server, in accordance with one embodiment of the present disclosure.

FIG. 13 is a simplified block diagram of a merchant server 1300, in accordance with one embodiment of the present disclosure. The merchant server 1300 is an example of the merchant server 115 of FIG. 1. The merchant server 1300 provides mobile and web merchant applications/e-commerce applications to provide its registered users to purchase goods and services from remote locations by making cardless payments. The merchant server 1300 includes at least one processing module 1305 communicably coupled to a communication interface 1310, at least one memory 1315 and a Merchant Plug-In (MPI) 1325. In at least one embodiment, the merchant server 1300 may be accessible to remote devices, such as a remote device 1330, through the communication network 150 or the payment network 145. The components of the merchant server 1300 provided herein may not be exhaustive, and that the merchant server 1300 may include more or fewer components than those depicted in FIG. 13. Further, two or more components may be embodied in one single component, and/or one component may be configured using multiple sub-components to achieve the desired functionalities. Some components of the merchant server 1300 may be configured using hardware elements, software elements, firmware elements and/or a combination thereof.

The processing module 1305 is capable of executing the stored machine executable instructions of a merchant application 1320 (e.g., the merchant application 102c of FIG. 1) in the memory 1315 or within the processing module 1305 or any storage location accessible to the processing module 1305. The communication interface 1310 is configured to cause display of user interfaces on the remote device 1330 (e.g., the user device 1235). Via the merchant application 1320, the processing module 1305 is configured to provide a dedicated payment method to the consumer for performing a pre-authenticated e-commerce transaction. Other non-exhaustive examples of a plurality of payment methods include payment using payment cards, digital tokens, net banking, wallet applications etc.

The MPI 1325 is an ecommerce software module installed on the merchant server 1300. The MPI 1325 assists 3-D Secure verifications to help prevent credit card fraud. When a consumer begins an online checkout process, the MPI 1325 identifies the credit card account number the consumer has entered and contacts the card issuer for authorization. The MPI 1325 handles the passing of information from the consumer to the merchant's platform and to the credit card issuer and then back again, making a three-point system of checks and balances to prevent fraud.

In one embodiment, the processing module 1305 receives pre-authentication request signal for a prospective e-commerce transaction for a payment card of a user 102 using a UI displayed by the merchant application 1320 on the user device 1235 via the communication interface 1310. The processing module 1305, in conjunction with the MPI 1325, sends pre-authentication request signal and a request to verify if the ACS has participated for performing pre-authentication to a directory server 120 of the payment network 145. The processing module 1305 receives a digitally signed authentication response of successfully performed pre-authentication from the ACS via the MPI 1325. The processing module 1305 verifies the digital signatures of the authentication response. The processing module 1305 also sends the payment card number to an acquirer server associated with an acquirer of the merchant to initiate the pre-authorization process. The processing module 1305 is further configured to receive an e-commerce transaction request signal to process the pre-authenticated e-commerce transaction at the expected transaction time using a UI displayed by the merchant application 1320 on the user device 1235 via the communication interface 1310.

Figure 14:
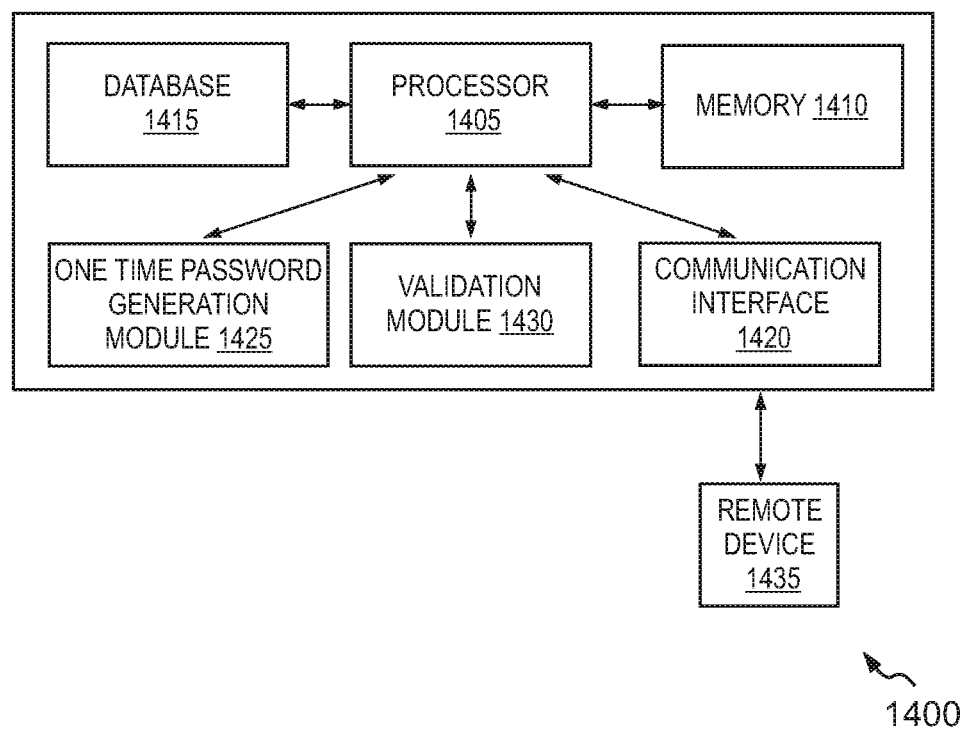
FIG. 14 is a simplified block diagram of an access control server, in accordance with one embodiment of the present disclosure.

FIG. 14 is a simplified block diagram of an Access Control Server (ACS) 1400, in accordance with one embodiment of the present disclosure. The ACS 1400 may correspond to the ACS 125 of FIG. 1. Further, the ACS 1400 may be deployed on the issuer server 135 as a software module in the 3-D Secure protocol. Alternatively, the issuer bank/issuer outsources development and management of the ACS 1400 to a third party. The ACS 1400 includes a processor 1405 configured to extract programming instructions from a memory 1410 to provide various features of the present disclosure. The components of the ACS 1400 provided herein may not be exhaustive, and that the ACS 1400 may include more or fewer components than those depicted in FIG. 14. Further, two or more components may be embodied in one single component, and/or one component may be configured using multiple sub-components to achieve the desired functionalities. Some components of the ACS 1400 may be configured using hardware elements, software elements, firmware elements and/or a combination thereof.

Via the communication interface 1420, the processor 1405 receives a pre-authentication request signal for a prospective e-commerce transaction. A contact information associated with a payment card of a user 102 is stored in a database 1415 for later retrieval. A One-Time Password (OTP) generation module 1425, operatively coupled to the processor 1405, is configured to generate the OTP to be sent at the contact information of the user 102 via the communication interface 1420. The communication interface 1420 is configured to cause display of user interface on a remote device 1435 (e.g., the user device 1235) to enable the user 102 to enter the OTP. In one embodiment, the communication interface 1420 includes a transceiver for wirelessly communicating information to, or receiving information from, the remote device 1435 or other suitable display device, and/or another type of remote processing device. In another embodiment, the communication interface 1420 is capable of facilitating operative communication with the remote devices and a cloud server using Application Program Interface (API) calls, without loss of generality. The communication may be achieved over the communication network 150.

A validation module 1430 electronically interacts with the OTP generation module 1425 to validate the OTP entered by the user 102 using the corresponding UI. Upon successful verification of the OTP, the processor 1405 generates an authentication response of successfully performed pre-authentication and digitally signs the authentication response. The processor 1405 notifies the merchant server 1300 via the MPI 1325 by sending the digitally signed successful authentication response.

Apart from authentication of the transactions, the processor 1405 is configured to provide one or more features such as, but not limited to, new customer registration for authentication, bank web portal, existing customer data upload, user access control, BIN checking, customer authentication while registration process, risk management, payment analytics and the like. Further, the processor 1405 is capable of performing multi-factor authentication where the user is needed to authenticate himself using a static password (e.g., single-factor authentication), an OTP sent to his mobile number and email ID (e.g., two-factor authentication) and a biometric scan such as finger print scan (e.g., multi-factor authentication). Apart from the static password and OTP, the processor 1405 provides various authentication options such as ID card authentication, combination of static and dynamic password, Automated Teller Machine (ATM) PIN and the like.

Figure 15:
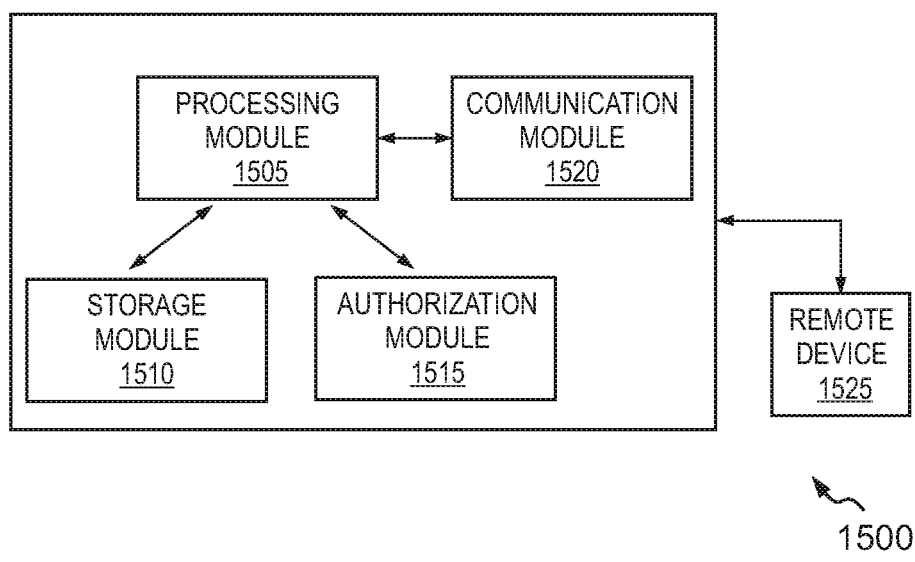
FIG. 15 is a simplified block diagram of an issuer server, in accordance with one embodiment of the present disclosure.

FIG. 15 is a simplified block diagram of an issuer server 1500, in accordance with one embodiment of the present disclosure. The issuer server 1500 is an example of the issuer server 135 of FIG. 1, or may be embodied in the issuer server 135. The issuer server 1500 is associated with an issuer bank/issuer, in which a user 102 may have an account. The issuer server 1500 includes a processing module 1505 operatively coupled to a storage module 1510, an authorization module 1515, and a communication module 1520. The components of the issuer server 1500 provided herein may not be exhaustive, and that the issuer server 1500 may include more or fewer components than those depicted in FIG. 15. Further, two or more components may be embodied in one single component, and/or one component may be configured using multiple sub-components to achieve the desired functionalities. Some components of the issuer server 1500 may be configured using hardware elements, software elements, firmware elements and/or a combination thereof.

The storage module 1510 is configured to store machine executable instructions to be accessed by the processing module 1505. Additionally, the storage module 1510 stores information related to, contact information of the user (e.g., the user 102 of FIG. 1), identification information of the user, bank account number, BICs, payment card details, internet banking information, PIN, mobile personal identification number (MPIN) for mobile banking and the like.

The PIN is a four-digit identification code issued by the issuer bank of the user 102 while registering for electronic payment transactions or while issuing the payment card to the user 102. For example, the PIN may be issued for swipe based transactions, mobile banking, internet banking, and the like. The PIN is needed to be verified for authentication of the user's identity and association with the issuer bank to process the payment transaction. This information is retrieved by the processing module 1505 for cross-verification during payment transactions.

The processing module 1505, in conjunction with the authorization module 1515, is configured to validate the payment card data of the payment card possessed by the user 102 as received from the payment server 140 via the communication module 1520. Additionally, the processing module 1505 is configured to verify the PIN (e.g., whether the four-digit numeric code matches the PIN issued by the issuer), the sufficient funds in the issuer account against the transaction amount and the like. Upon successful pre-authorization of the payment card information and the cardholder only, the payment transaction is processed further by the processing module 1505 by debiting the transaction amount from the issuer account of the user 102.

The processing module 1505 is further configured to communicate with one or more remote devices such as a remote device 1525 using the communication module 1520 over the communication network 150 or the payment network 145 of FIG. 1. The examples of the remote device 1525 include, the payment server 140, the acquirer server 130, the merchant server 1300, the wallet server 155, other computing systems of issuer and the payment network 145 and the like. The communication module 1520 is capable of facilitating such operative communication with the remote devices and cloud servers using API (Application Program Interface) calls. In one embodiment, the issuer server 1500 is configured to include an ACS module (not shown, e.g., the ACS 1400) to perform pre-authentication. In another embodiment, the ACS 1400 is a separate entity from the issuer server 1500.

Figure 16:
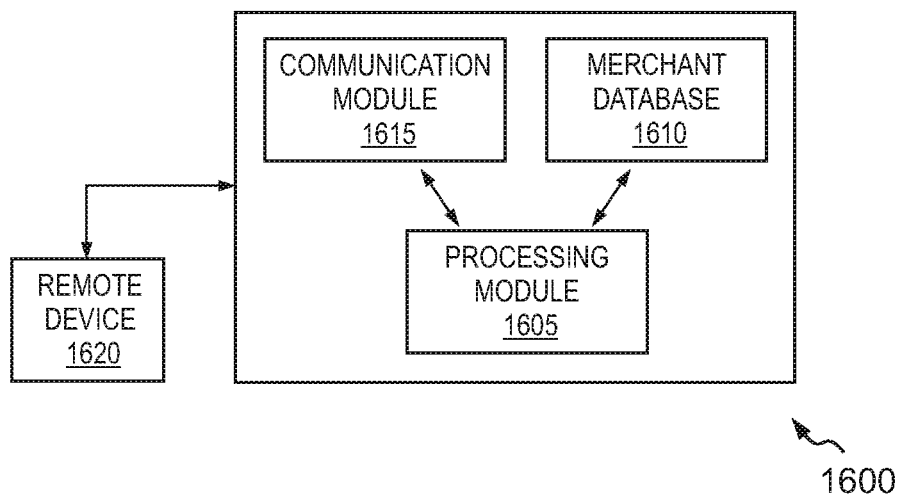
FIG. 16 is a simplified block diagram of an acquirer server, in accordance with one embodiment of the present disclosure.

FIG. 16 is a simplified block diagram of an acquirer server 1600, in accordance with one embodiment of the present disclosure. The acquirer server 1600 is associated with the acquirer of a merchant where the merchant has established an account to accept payment performed using the payment card. The acquirer server 1600 is an example of the acquirer server 130 of FIG. 1, or may be embodied in the acquirer server 130. The acquirer server 1600 includes a processing module 1605 communicably coupled to a merchant database 1610 and a communication module 1615. The components of the acquirer server 1600 provided herein may not be exhaustive, and that the acquirer server 1600 may include more or fewer components than those depicted in FIG. 16. Further, two or more components may be embodied in one single component, and/or one component may be configured using multiple sub-components to achieve the desired functionalities. Some components of the acquirer server 1600 may be configured using hardware elements, software elements, firmware elements and/or a combination thereof.

The merchant database 1610 includes data related to merchant, such as, but not limited to, a merchant primary account number (PAN), a merchant name, a merchant category code (MCC), a merchant city, a merchant postal code, a merchant brand name, a merchant ID and the like. The processing module 1605 is configured to use the merchant ID to identify the merchant during the normal processing of payment transactions, adjustments, chargebacks, end-of-month fees and so forth. The merchant ID is different from other merchant account numbers, particularly from those that identify merchants to the equipments (e.g., the POS terminals or any other merchant electronic devices/interfaces) they use for processing transactions. A merchant with a single merchant processing account number may use several terminals at one location, resulting in one merchant ID and several Terminal Identification numbers (TIDs). The processing module 1605 may be configured to store and update such merchant information in the merchant database 1610 for later retrieval.

In an embodiment, the communication module 1615 is capable of facilitating operative communication with a remote device 1620 (e.g., the issuer server 1500, the merchant server 1300, and/or the payment server 140) using API calls. The communication may be achieved over the communication network 150. For example, the processing module 1605 may receive the pre-authentication request signal and the e-commerce transaction request signal from the merchant server 1300 using the communication module 1615. Further, the processing module 1605 is configured to receive the purchase amount debited from the transaction amount at the expected transaction time from the payment server 140 using the communication module 1615. Thereafter, the processing module 1605 may retrieve merchant PAN from the merchant database 1610 to credit the purchase amount in the acquirer account of the merchant.

The processing module 1605 is configured to receive a balance amount reversal request signal from the user device 1235 via the communication module 1615 after the pre-authenticated e-commerce transaction is completed. The processing module 1605 is also configured to send a non-receipt confirmation signal of not yet received pre-authentication request signal to the payment server 140 so that the transaction amount held by the payment server 140 can be credited back to the issuer account of the user 102. Further, in an example embodiment, the processing module 1605 is configured to send a notification of successful pre-authentication of the prospective e-commerce transaction and a transaction status of the pre-authenticated e-commerce transaction to a merchant device of the merchant and the user device 1235.

Figure 17:
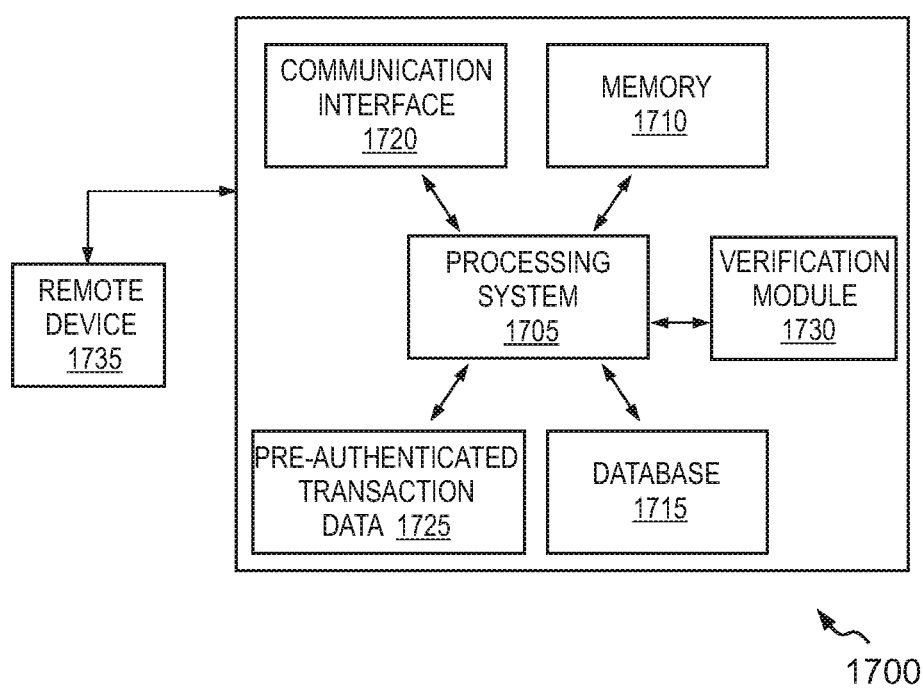
FIG. 17 is a simplified block diagram of a payment server, in accordance with one embodiment of the present disclosure.

FIG. 17 is a simplified block diagram of a payment server 1700, in accordance with one embodiment of the present disclosure. The payment server 1700 may correspond to the payment server 140 of FIG. 1. As explained with reference to FIG. 1, the payment server 140 is associated with a payment network 145. The payment network 145 may be used by the merchant server 1300, the issuer server 1500, the acquirer server 1600, the directory server 120, the wallet server 155 and the ACS 1400 as a payment interchange network. The payment server 1700 includes a processing system 1705 configured to extract programming instructions from a memory 1710 to provide various features of the present disclosure. The components of the payment server 1700 provided herein may not be exhaustive, and that the payment server 1700 may include more or fewer components than those depicted in FIG. 17. Further, two or more components may be embodied in one single component, and/or one component may be configured using multiple sub-components to achieve the desired functionalities. Some components of the payment server 1700 may be configured using hardware elements, software elements, firmware elements and/or a combination thereof.

In an embodiment, the processing system 1705 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The memory 1710 is configured to store machine executable instructions to be accessed by the processing system 1705. The memory 1710 can be any type of storage accessible to the processing system 1705. For example, the memory 1710 may include volatile or non-volatile memories, or a combination thereof. In some non-limiting examples, the memory 1710 can be four to sixty-four Gigabytes (GB) of Dynamic Random Access Memory ("DRAM") or Static Random Access Memory ("SRAM"). In addition, some examples may include supplementary flash memory installed via a PCMCIA slot.

The communication interface 1720 is configured to cause display of user interfaces on the remote device 1735 (e.g., the user device 1235) for enabling a user 102 to enter a time data for an expected transaction time, a transaction amount data, a payment card data of a payment card, at least one transaction identifier data and the like to generate a pre-authentication request signal for a prospective e-commerce transaction for the payment card of the user 102. The communication may be achieved through API calls, without loss of generality. The processing system 1705 electronically facilitates the pre-authentication of the prospective e-commerce transaction based on performing a multi-factor pre-authentication. A pre-authenticated transaction data 1725 for the prospective e-commerce transaction is stored in a database 1715 after the pre-authentication process completes. Some non-exhaustive examples of the pre-authenticated transaction data 1725 include the time data for the expected transaction time, the transaction amount data, the payment card data of the payment card, a merchant ID, a prospective e-commerce transaction reference number, an e-commerce application login ID of the user, a wallet application login ID of the user, an e-commerce application URL, a wallet application URL and the like.

Upon receiving a notification signal of successful pre-authentication of the prospective e-commerce transaction from the issuer server 1500, the processing system 1705 holds the transaction amount for processing the pre-authenticated prospective e-commerce transaction at the expected transaction time. The processing system 1705 electronically facilitates reversal of the transaction amount, if the user input is not received to process the pre-authenticated prospective e-commerce transaction at the expected transaction time. However, if the user input is received by way of an e-commerce transaction request signal to process the pre-authenticated e-commerce transaction at the expected transaction time, a verification module 1730 verifies the data received through the e-commerce transaction request signal with the pre-authenticated transaction data 1725 stored in the database 1715. Via the communication interface 1720, the processing system 1705 sends a successful verification notification signal of the pre-authentication of the e-commerce transaction to the acquirer server 1600 for crediting a purchase amount from the transaction amount to a merchant account. The processing system 1705 also electronically facilitates reversal of a balance amount calculated from a difference of the transaction amount and the purchase amount to the issuer account of the user 102.

Figure 18:
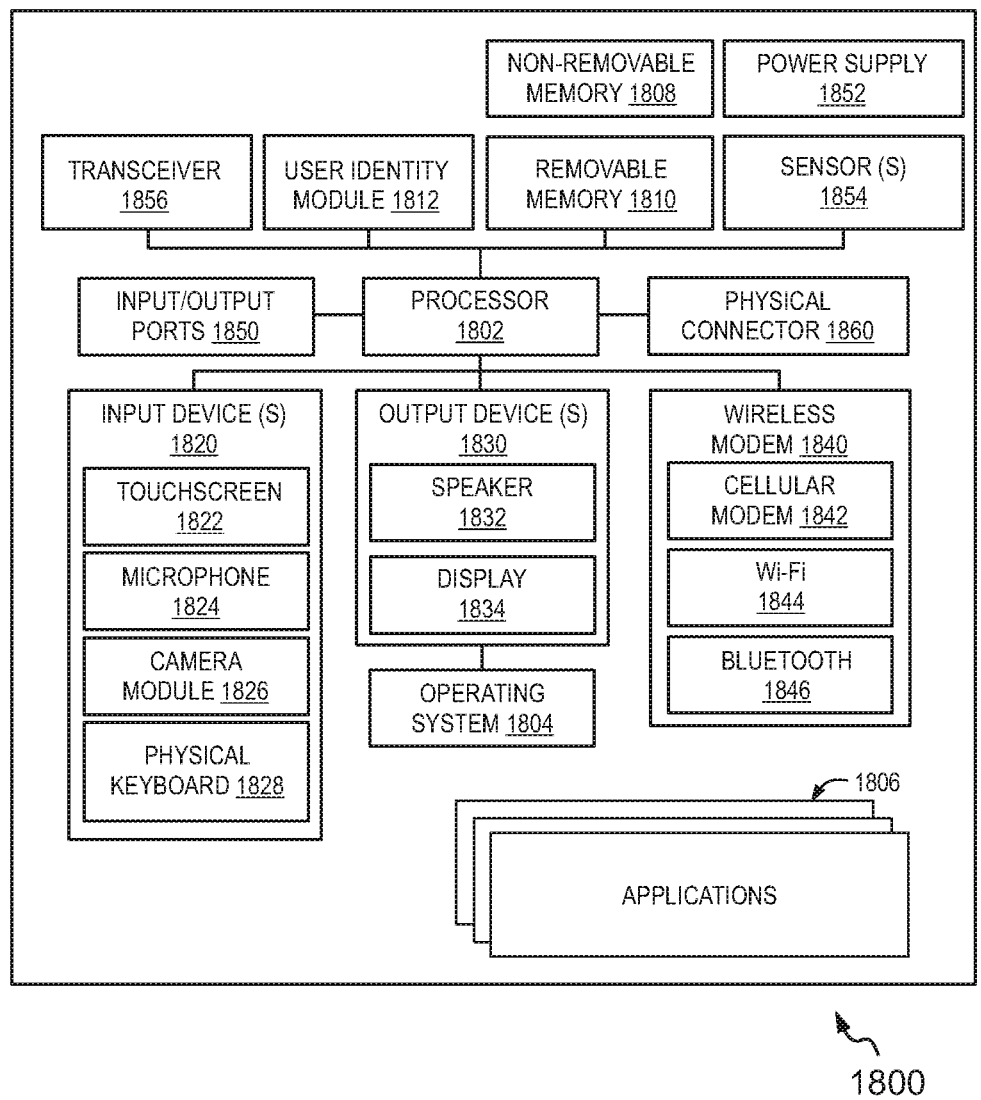
FIG. 18 shows simplified block diagram of a user device capable of implementing at least some embodiments of the present disclosure.

FIG. 18 shows simplified block diagram of a user device 1800 capable of implementing the various embodiments of the present disclosure. For example, the user device 1800 may correspond to the user device 102a of FIG. 1. The user device 1800 is depicted to include one or more applications, such as a merchant application, a wallet application or a payment application. The applications are capable of communicating with any of the servers 115, 120, 125, 130, 135, 155 and 140 for completing a pre-authenticated prospective e-commerce transaction.

It should be understood that the user device 1800 as illustrated and hereinafter described is merely illustrative of one type of device and should not be taken to limit the scope of the embodiments. As such, it should be appreciated that at least some of the components described below in connection with that the user device 1800 may be optional and thus in an example embodiment may include more, less or different components than those described in connection with the example embodiment of the FIG. 18. As such, among other examples, the user device 1800 could be any of a mobile electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated user device 1800 includes a controller or a processor 1802 (e.g., a signal processor, microprocessor, ASIC, or other control and processing logic circuitry) for performing tasks such as signal coding, data processing, image processing, input/output processing, power control, and/or other functions. An operating system 1804 controls the allocation and usage of the components of the user device 1800 and supports for one or more payment application programs (see, applications 1806) that implement one or more of the innovative features as described herein. In addition, the applications 1806 may include common mobile computing applications (e.g., telephony applications, email applications, calendars, contact managers, web browsers, messaging applications) or any other computing application.

The illustrated user device 1800 includes one or more memory components, for example, a non-removable memory 1808 and/or a removable memory 1810. The non-removable memory 1808 and/or the removable memory 1810 may be collectively known as database in an embodiment. The non-removable memory 1808 can include RAM, ROM, flash memory, a hard disk, or other well-known memory storage technologies. The removable memory 1810 can include flash memory, smart cards, or a Subscriber Identity Module (SIM). The one or more memory components can be used for storing data and/or code for running the operating system 1804 and the applications 1806. The user device 1800 may further include a user identity module (UIM) 1812. The UIM 1812 may be a memory device having a processor built in. The UIM 1812 may include, for example, a subscriber identity module (SIM), a universal integrated circuit card (UICC), a universal subscriber identity module (USIM), a removable user identity module (R-UIM), or any other smart card. The UIM 1812 typically stores information elements related to a mobile subscriber. The UIM 1812 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The user device 1800 can support one or more input devices 1820 and one or more output devices 1830. Examples of the input devices 1820 may include, but are not limited to, a touch screen/a display screen 1822 (e.g., capable of capturing finger tap inputs, finger gesture inputs, multi-finger tap inputs, multi-finger gesture inputs, or keystroke inputs from a virtual keyboard or keypad), a microphone 1824 (e.g., capable of capturing voice input), a camera module 1826 (e.g., capable of capturing still picture images and/or video images) and a physical keyboard 1828. Examples of the output devices 1830 may include but are not limited to a speaker 1832 and a display 1834. Other possible output devices can include piezoelectric or other haptic output devices. Some devices can serve more than one input/output function. For example, the touch screen 1822 and the display 1834 can be combined into a single input/output device.

A wireless modem 1840 can be coupled to one or more antennas (not shown in the FIG. 18) and can support two-way communications between the processor 1802 and external devices, as is well understood in the art. The wireless modem 1840 is shown generically and can include, for example, a cellular modem 1842 for communicating at long range with the mobile communication network, a Wi-Fi compatible modem 1844 for communicating at short range with an external Bluetooth-equipped device or a local wireless data network or router, and/or a Bluetooth-compatible modem 1846. The wireless modem 1840 is typically configured for communication with one or more cellular networks, such as a GSM network for data and voice communications within a single cellular network, between cellular networks, or between the user device 1800 and a public switched telephone network (PSTN).

The user device 1800 can further include one or more input/output ports 1850, a power supply 1852, one or more sensors 1854 for example, an accelerometer, a gyroscope, a compass, or an infrared proximity sensor for detecting the orientation or motion of the user device 1800 and biometric sensors for scanning biometric identity of an authorized user 102, a transceiver 1856 (for wirelessly transmitting analog or digital signals) and/or a physical connector 1860, which can be a USB port, IEEE 1294 (FireWire) port, and/or RS-232 port. The illustrated components are not required or all-inclusive, as any of the components shown can be deleted and other components can be added.

The disclosed methods with reference to FIG. 10 and FIG. 11, or one or more operations of the method 1000 and the method 1100 may be implemented using software including computer-executable instructions stored on one or more computer-readable media (e.g., non-transitory computer-readable media), such as one or more optical media discs, volatile memory components (e.g., DRAM or SRAM), or non-volatile memory or storage components (e.g., hard drives or solid-state non-volatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network)) using one or more network computers. Additionally, any of the intermediate or final data created and used during implementation of the disclosed methods or systems may also be stored on one or more computer-readable media (e.g., non-transitory computer-readable media) and is considered to be within the scope of the disclosed technology. Furthermore, any of the software-based embodiments may be uploaded, downloaded, or remotely accessed through a suitable communication means. Such suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server systems 115, 120, 125, 130, 135, 155 and 140 its various components such as the computer system 1205 and the database 1210 may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and are well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

We claim:

1. A computer implemented method comprising the operations of:
   receiving, by a directory server and in advance of a future transaction associated with a payment card of a user, a pre-authentication request signal from a merchant server, the pre-authentication request signal comprising a time data for an expected transaction time, a transaction amount data, a payment card data of the payment card, and at least one transaction identifier data, wherein the time data, the transaction amount data, the payment card data, and the at least one transaction identifier data are associated with the future transaction;
   extracting, by the directory server, a bank identifier number (BIN) from the payment card data;
   based on the extracted BIN, identifying, by the directory server, an access control server (ACS) participating in pre-authentication of the future transaction, the ACS associated with an issuer of the payment card of the user, the issuer associated with an issuer server;
   transmitting, by the directory server, the pre-authentication request signal to the issuer server;
   retrieving, by the directory server, a corresponding universal resource locator (URL) of the ACS from a database;
   transmitting, by the directory server, the URL to a user device associated with the user;
   receiving, by the ACS, a request to load corresponding user interfaces (UIs) from the user device;
   retrieving, by the ACS, contact information associated with the user;
   transmitting, by the ACS, a one-time password (OTP) to the user based on the contact information;
   receiving, by the ACS, a second OTP via input of the second OTP by the user into one of the corresponding UIs;
   pre-authenticating, by the ACS, the prospective e-commerce transaction by validating that the received second OTP matches the OTP transmitted to the user based on the contact information;
   transmitting, by the ACS, a digitally signed authentication response and pre-authenticated transaction data associated with the future transaction to a payment server, the digitally signed authentication response indicative of successfully pre-authenticating the prospective e-commerce transaction;
   upon successful pre-authentication of the prospective e-commerce transaction by the ACS, receiving, by the payment server from the ACS, the pre-authenticated transaction data associated with the future transaction, the pre-authenticated transaction data including the time data, the transaction amount data, the payment card data, and the at least one transaction identifier data associated with the future transaction;
   receiving, by the payment server, a transaction amount from the issuer server, the transaction amount corresponding to the transaction amount data;
   storing, by the payment server, the pre-authenticated transaction data in the database and the transaction amount in an electronic wallet;
   transmitting, by the payment server, a notification signal of successful pre-authentication of the future transaction to the user device;
   on the user device, receiving a selection of a pre-authenticated transaction payment method and, in response, generating an e-commerce transaction request signal by the user device;
   receiving, by the payment server, the e-commerce transaction request signal, the e-commerce transaction request signal including, based on the selection of the pre-authenticated transaction payment method, a purchase data amount, the at least one transaction identifier data, and a request generation time;
   matching, by the payment server, the at least one transaction identifier data received in the e-commerce transaction request signal to the at least one transaction identifier data stored with the pre-authenticated transaction data in the database;
   based on the matching, verifying, by the payment server, that the purchase data amount is less than or equal to the transaction amount data and that the request generation time is at the expected transaction time stored with the pre-authenticated transaction data in the database; and
   based on the verifying, processing, by the payment server, the future transaction at the expected transaction time without transmitting the e-commerce transaction request signal to the issuer server for authorization and authentication approval, including debiting the purchase data amount from the transaction amount stored in the electronic wallet.

2. The method as claimed in claim 1, further comprising:
   sending, by the payment server, the transaction amount data and the payment card data of the payment card to the issuer server,
   receiving, by the payment server, the notification signal of successful pre-authentication of the future transaction from the issuer server, and
   upon receiving the notification signal, holding, by the payment server, the transaction amount for processing the future transaction at the expected transaction time.

3. The method as claimed in claim 1, further comprising:
   based on the verifying, sending, by the payment server, a successful verification notification signal of the pre-authentication of the future transaction to an acquirer.

4. The method as claimed in claim 3, further comprising:
   receiving, by the payment server, a balance amount reversal request signal from the user device, the balance amount being a difference between the transaction amount and the purchase amount; and
   electronically facilitating reversal of the balance amount.

5. The method as claimed in claim 1, wherein the at least one transaction identifier data is one or more of the following: a merchant ID, a prospective e-commerce transaction reference number, an e-commerce application login ID of the user, a wallet application login ID of the user, an e-commerce application Universal Resource Locator (URL), and a wallet application URL.

6. The method as claimed in claim 1, wherein the pre-authentication request signal is received from an e-commerce application running on the user device.

7. The method as claimed in claim 1, wherein the pre-authentication request signal is received from one of a payment application facilitated by the payment server and a wallet application.

8. A system comprising:
a user device associated with a user;
an access control server (ACS);
a payment server; and
a directory server;
said directory server comprising at least one directory server processor and at least one directory server non-transitory computer-readable memory storing computer executable instructions that, when executed by the at least one directory server processor, cause the at least one directory server processor to perform the operations of:
receiving, in advance of a future transaction associated with a payment card of the user, a pre-authentication request signal from a merchant server, the pre-authentication request signal comprising a time data for an expected transaction time, a transaction amount data, a payment card data of the payment card, and at least one transaction identifier data, wherein the time data, the transaction amount data, the payment card data, and the at least one transaction identifier data are associated with the future transaction,
extracting a bank identifier number (BIN) from the payment card data,
based on the extracted BIN, identifying the ACS participating in pre-authentication of the future transaction, the ACS associated with an issuer of the payment card of the user, the issuer associated with an issuer server,
transmitting the pre-authentication request signal to the issuer server,
retrieving a corresponding universal resource locator (URL) of the ACS from a database, and
transmitting the URL to a user device associated with the user,
said ACS comprising at least one ACS processor and at least one ACS non-transitory computer-readable memory storing computer executable instructions that, when executed by the at least one ACS processor, cause the at least one ACS processor to perform the operations of:
receiving a request to load corresponding user interfaces (UIs) from the user device,
retrieving contact information associated with the user,
transmitting a one-time password (OTP) to the user based on the contact information,
receiving a second OTP via input of the second OTP by the user into one of the corresponding UIs,
pre-authenticating the prospective e-commerce transaction by validating that the received second OTP matches the OTP transmitted to the user based on the contact information, and
transmitting a digitally signed authentication response and pre-authenticated transaction data associated with the future transaction to a payment server, the digitally signed authentication response indicative of successfully pre-authenticating the prospective e-commerce transaction,
said payment server comprising at least one payment server processor and at least one payment server non-transitory computer-readable memory storing computer executable instructions that, when executed by the at least one payment server processor, cause the at least one payment server processor to perform the operations of:
upon successful pre-authentication of the prospective e-commerce transaction by the ACS, receiving, from the ACS, the pre-authenticated transaction data associated with the future transaction, the pre-authenticated transaction data including the time data, the transaction amount data, the payment card data, and the at least one transaction identifier data associated with the future transaction,
receiving a transaction amount from the issuer server, the transaction amount corresponding to the transaction amount data,
storing the pre-authenticated transaction data in the database and the transaction amount in an electronic wallet, and
transmitting a notification signal of successful pre-authentication of the future transaction to the user device,
said user device comprising at least one user device processor and at least one user device non-transitory computer-readable memory storing computer executable instructions that, when executed by the at least one user device processor, cause the at least one user device processor to perform the operations of:
receiving a selection of a pre-authenticated transaction payment method, and
in response, generating an e-commerce transaction request signal by the user device,
said at least one payment server non-transitory computer-readable memory storing further computer executable instructions that, when executed by the at least one payment server processor, cause the at least one payment server processor to perform the operations of:
receiving the e-commerce transaction request signal, the e-commerce transaction request signal including, based on the selection of the pre-authenticated transaction payment method, a purchase data amount, the at least one transaction identifier data, and a request generation time,
matching the at least one transaction identifier data received in the e-commerce transaction request signal to the at least one transaction identifier data stored with the pre-authenticated transaction data in the database,
based on the matching, verifying that the purchase data amount is less than or equal to the transaction amount data and that the request generation time is at the expected transaction time stored with the pre-authenticated transaction data in the database, and
based on the verifying, processing the future transaction at the expected transaction time without transmitting the e-commerce transaction request signal to the issuer server for authorization and authentication approval, including debiting the purchase data amount from the transaction amount stored in the electronic wallet.

9. The system as claimed in claim 8, the payment server further configured to perform the operations of:
- sending the transaction amount data and the payment card data of the payment card to the issuer server,
- receiving the notification signal of successful pre-authentication of the future transaction from the issuer server, and
- upon receiving a notification signal, holding the transaction amount for processing the future transaction at the expected transaction time.

10. The system as claimed in claim 8, the at least one payment server non-transitory computer-readable memory storing further computer executable instructions that, when executed by the at least one payment server processor, cause the at least one payment server processor to perform the operations of: based on the verifying, sending a successful verification notification signal of the pre-authentication of the future transaction to an acquirer server.

11. The system as claimed in claim 10, the at least one payment server non-transitory computer-readable memory storing further computer executable instructions that, when executed by the at least one payment server processor, cause the at least one payment server processor to perform the operations of: receiving a balance amount reversal request signal from the user device, the balance amount being a difference between the transaction amount and the purchase amount; and electronically facilitate reversal of the balance amount.

12. The system as claimed in claim 8, wherein the at least one transaction identifier data is one or more of the following: a merchant ID, a prospective e-commerce transaction reference number, an e-commerce application login ID of the user, a wallet application login ID of the user, an e-commerce application Universal Resource Locator (URL), and a wallet application URL.

13. The system as claimed in claim 8, wherein the pre-authentication request signal is received from an e-commerce application running on the user device.

14. The system as claimed in claim 8, wherein the pre-authentication request signal is received from one of a payment application facilitated by the system and a wallet application.

* * * * *